(12) United States Patent
Fitzwater et al.

(10) Patent No.: US 10,583,852 B2
(45) Date of Patent: Mar. 10, 2020

(54) FOLDABLE WAGON

(71) Applicant: RADIO FLYER INC., Chicago, IL (US)

(72) Inventors: Jason Fitzwater, Chicago, IL (US); Matthew E. Young, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 321 days.

(21) Appl. No.: 15/801,973

(22) Filed: Nov. 2, 2017

(65) Prior Publication Data

US 2018/0118243 A1 May 3, 2018

Related U.S. Application Data

(60) Provisional application No. 62/416,382, filed on Nov. 2, 2016.

(51) Int. Cl.
*B62B 3/02* (2006.01)
*B62B 5/08* (2006.01)
*B62B 3/00* (2006.01)
*B62B 7/00* (2006.01)

(52) U.S. Cl.
CPC ............. *B62B 3/025* (2013.01); *B62B 3/007* (2013.01); *B62B 5/082* (2013.01); *B62B 7/008* (2013.01); *B62B 2205/18* (2013.01)

(58) Field of Classification Search
CPC ........................................................ B62B 3/02
See application file for complete search history.

(56) References Cited

U.S. PATENT DOCUMENTS

| | | |
|---|---|---|
| 434,672 A | 8/1890 | Mersick |
| 2,468,316 A | 4/1949 | Waters |
| 2,671,520 A | 3/1954 | Elliott et al. |
| 2,906,357 A | 9/1959 | Pletka |
| 2,923,365 A | 2/1960 | McKechnie |
| 2,942,579 A | 6/1960 | Gibson |
| 2,989,318 A | 6/1961 | Schenkman |
| 3,036,651 A | 5/1962 | Paul et al. |
| 3,090,459 A | 5/1963 | Scudder |
| 3,182,835 A | 5/1965 | Meyer et al. |
| 3,280,932 A | 10/1966 | Moulton |
| 3,291,243 A | 12/1966 | Friesser |
| 3,356,172 A | 12/1967 | Peckham et al. |

(Continued)

FOREIGN PATENT DOCUMENTS

TW M288610 U 11/2006

*Primary Examiner* — John D Walters
*Assistant Examiner* — James J Triggs
(74) *Attorney, Agent, or Firm* — Barnes & Thornburg LLP

(57) ABSTRACT

A foldable wagon is provided that is configurable in a use configuration and folded configuration. The foldable wagon has a front frame assembly, a rear frame assembly, a first upper pivot bracket and a first lower pivot bracket connecting the front frame assembly to the rear frame assembly. The wagon has a timing member to maintain the front and rear frame assemblies synched during folding and unfolding of the wagon. The wagon also has a footrest with a first end connected to the rear frame assembly and a second end free from connection to the front frame assembly. When the second end of the footrest is raised the rear frame assembly and the front frame assembly pivot from the use configuration to the folded configuration. The wagon also has foldable front and rear seatbacks.

22 Claims, 16 Drawing Sheets

(56) References Cited

U.S. PATENT DOCUMENTS

| | | | |
|---|---|---|---|
| 3,407,892 A | 10/1968 | Vosseller | |
| 3,524,512 A | 8/1970 | Voeks et al. | |
| 3,704,758 A | 12/1972 | Cropp | |
| 3,731,756 A | 5/1973 | Hajec | |
| 3,742,507 A | 6/1973 | Pirre | |
| 3,773,131 A | 11/1973 | Jaulmes | |
| 3,841,428 A | 10/1974 | Bialek | |
| 3,871,464 A | 3/1975 | Eden | |
| 3,893,532 A | 7/1975 | Perlowin | |
| 3,905,442 A | 9/1975 | O'Neill, Jr. | |
| 3,915,250 A | 10/1975 | Laden et al. | |
| 3,921,741 A | 11/1975 | Garfinkle et al. | |
| 3,939,932 A | 2/1976 | Rosen | |
| 3,991,843 A | 11/1976 | Davidson | |
| 4,030,562 A | 6/1977 | Leighton et al. | |
| 4,044,851 A | 8/1977 | Shaw et al. | |
| 4,085,814 A | 4/1978 | Davidson et al. | |
| 4,095,663 A | 6/1978 | Gaffney | |
| 4,105,084 A | 8/1978 | Baak | |
| 4,106,583 A | 8/1978 | Nemeth | |
| 4,122,907 A | 10/1978 | Davidson et al. | |
| 4,143,730 A | 3/1979 | Desmond | |
| 4,168,758 A | 9/1979 | Holt | |
| 4,221,275 A | 9/1980 | Pennebaker et al. | |
| 4,280,581 A | 7/1981 | Rudwick | |
| 4,393,954 A | 7/1983 | Soucy et al. | |
| D270,552 S | 9/1983 | Echterling | |
| 4,410,060 A | 10/1983 | Cunard | |
| 4,413,692 A | 11/1983 | Clifft | |
| D275,691 S | 9/1984 | Appel et al. | |
| 4,538,696 A | 9/1985 | Carter | |
| 4,570,732 A | 2/1986 | Craven | |
| 4,591,017 A | 5/1986 | Enjo et al. | |
| 4,615,406 A | 10/1986 | Bottenschein et al. | |
| 4,637,274 A | 6/1987 | Goldenfield | |
| D295,732 S | 5/1988 | Nilsson | |
| 4,771,840 A | 9/1988 | Keller | |
| 4,844,493 A | 7/1989 | Kramer | |
| 4,844,683 A | 7/1989 | Compton | |
| 4,848,504 A | 7/1989 | Olson | |
| D311,554 S | 10/1990 | Valiga et al. | |
| 4,960,179 A | 10/1990 | Leach | |
| D326,288 S | 5/1992 | Arnott | |
| 5,137,103 A | 8/1992 | Cartmell | |
| 5,161,635 A | 11/1992 | Kiffe | |
| 5,167,389 A | 12/1992 | Reimers | |
| 5,180,023 A | 6/1993 | Reimers | |
| 5,226,501 A | 7/1993 | Takata | |
| 5,237,263 A | 8/1993 | Gannon | |
| 5,245,144 A | 9/1993 | Stammen | |
| 5,316,101 A | 5/1994 | Gannon | |
| 5,341,892 A | 8/1994 | Hirose et al. | |
| 5,350,982 A | 9/1994 | Seib | |
| 5,368,122 A | 11/1994 | Chou | |
| 5,370,200 A | 12/1994 | Takata | |
| 5,375,676 A | 12/1994 | Takata et al. | |
| 5,433,284 A | 7/1995 | Chou | |
| 5,474,148 A | 12/1995 | Takata | |
| 5,505,277 A | 4/1996 | Suganuma et al. | |
| D369,629 S | 5/1996 | Pasin et al. | |
| 5,526,894 A | 6/1996 | Wang | |
| 5,538,267 A * | 7/1996 | Pasin | A63H 33/003 280/47.35 |
| 5,540,296 A | 7/1996 | Strothmann | |
| 5,547,035 A | 8/1996 | Berry | |
| 5,560,383 A | 10/1996 | Fuller | |
| 5,602,448 A | 2/1997 | Yaguchi | |
| 5,603,388 A | 2/1997 | Yaguchi | |
| 5,657,828 A | 8/1997 | Nagamachi | |
| 5,662,187 A | 9/1997 | McGovern | |
| 5,664,636 A | 9/1997 | Ikuma et al. | |
| 5,685,385 A | 11/1997 | Sanuga | |
| D389,877 S | 1/1998 | Pasin | |
| 5,746,282 A | 5/1998 | Fujiwara et al. | |
| 5,749,424 A | 5/1998 | Reimers | |
| 5,749,429 A | 5/1998 | Yamauchi et al. | |
| 5,755,304 A | 5/1998 | Trigg et al. | |
| 5,758,736 A | 6/1998 | Yamauchi | |
| 5,777,442 A | 7/1998 | Miyata | |
| 5,799,747 A | 9/1998 | Olsen | |
| 5,806,621 A | 9/1998 | Soda et al. | |
| 5,806,864 A | 9/1998 | Zielinski | |
| 5,816,355 A | 10/1998 | Battlogg et al. | |
| 5,819,867 A | 10/1998 | Matsumoto et al. | |
| D403,026 S | 12/1998 | Pasin | |
| 5,857,537 A | 1/1999 | Matsumoto et al. | |
| 5,860,487 A | 1/1999 | Tanaka et al. | |
| 5,865,267 A | 2/1999 | Mayer et al. | |
| 5,878,831 A | 3/1999 | Saito et al. | |
| 5,899,284 A | 5/1999 | Reimers et al. | |
| 5,909,781 A | 6/1999 | Yonekawa et al. | |
| 5,910,714 A | 6/1999 | Buchanan et al. | |
| 5,924,511 A | 7/1999 | Takata | |
| 5,934,401 A | 8/1999 | Mayer et al. | |
| 5,984,038 A | 11/1999 | Fujiwara et al. | |
| 6,011,366 A | 1/2000 | Murakami et al. | |
| 6,015,021 A | 1/2000 | Tanaka et al. | |
| 6,024,186 A | 2/2000 | Suga | |
| 6,062,328 A | 5/2000 | Campbell et al. | |
| 6,062,329 A | 5/2000 | Chai | |
| 6,065,557 A | 5/2000 | Von Key serling | |
| 6,070,679 A | 6/2000 | Berg et al. | |
| 6,073,717 A | 6/2000 | Yamamoto et al. | |
| 6,092,615 A | 7/2000 | Pusch et al. | |
| 6,104,154 A | 8/2000 | Harada et al. | |
| 6,131,683 A | 10/2000 | Wada | |
| 6,152,249 A | 11/2000 | Li et al. | |
| 6,152,250 A | 11/2000 | Shu-Hsien | |
| 6,173,801 B1 | 1/2001 | Kakutani et al. | |
| 6,186,264 B1 | 2/2001 | Fujiwara et al. | |
| 6,247,548 B1 | 6/2001 | Hayashi et al. | |
| 6,260,646 B1 | 7/2001 | Fernandez et al. | |
| 6,276,470 B1 | 8/2001 | Andreae, Jr. et al. | |
| 6,276,471 B1 | 8/2001 | Kratzenberg et al. | |
| 6,276,479 B1 | 8/2001 | Suzuki et al. | |
| 6,290,014 B1 | 9/2001 | MacCready, Jr. | |
| 6,296,072 B1 | 10/2001 | Turner | |
| 6,308,792 B1 | 10/2001 | Garrett | |
| RE37,443 E | 11/2001 | Yaguchi | |
| 6,320,336 B1 | 11/2001 | Eguchi | |
| 6,340,067 B1 | 1/2002 | Fujiwara et al. | |
| 6,343,665 B1 | 2/2002 | Eberlein et al. | |
| RE37,583 E | 3/2002 | Mayer et al. | |
| 6,364,044 B1 | 4/2002 | Juan | |
| D456,857 S | 5/2002 | Jennings | |
| D458,648 S | 6/2002 | Chiappetta et al. | |
| 6,459,222 B1 | 10/2002 | Chen | |
| 6,462,493 B2 | 10/2002 | Lan | |
| 6,470,981 B1 | 10/2002 | Sueshige et al. | |
| 6,580,188 B2 | 6/2003 | Katagiri et al. | |
| 6,591,929 B1 | 7/2003 | Tsuboi et al. | |
| D478,943 S | 8/2003 | Kuelbs | |
| 6,629,574 B2 | 10/2003 | Turner | |
| 6,634,452 B2 | 10/2003 | Cheng et al. | |
| D483,419 S | 12/2003 | Chiappetta et al. | |
| 6,659,565 B2 | 12/2003 | Brant | |
| 6,684,971 B2 | 2/2004 | Yu et al. | |
| 6,752,224 B2 | 6/2004 | Hopper et al. | |
| 6,772,850 B1 | 8/2004 | Waters et al. | |
| 6,886,111 B1 | 3/2005 | Dube et al. | |
| 6,874,592 B2 | 4/2005 | Yokotani et al. | |
| 6,880,661 B1 | 4/2005 | Oh | |
| 6,907,949 B1 | 6/2005 | Wang | |
| 6,957,129 B2 | 10/2005 | Hatanaka et al. | |
| 6,976,551 B2 | 12/2005 | Spanski | |
| 7,007,765 B2 | 3/2006 | Waters et al. | |
| 7,017,685 B2 | 3/2006 | Schoenberg | |
| 7,040,440 B2 | 5/2006 | Kurita et al. | |
| 7,150,339 B2 | 12/2006 | Liao et al. | |
| 7,163,213 B2 | 1/2007 | Chambers | |
| 7,185,726 B2 | 3/2007 | Young | |
| 7,210,545 B1 | 5/2007 | Waid | |
| 7,220,222 B2 | 5/2007 | Springston et al. | |
| D547,391 S | 7/2007 | Johnson et al. | |

(56) References Cited

U.S. PATENT DOCUMENTS

| | | |
|---|---|---|
| 7,261,175 B1 | 8/2007 | Fahrner |
| D564,039 S | 3/2008 | Rodriguez et al. |
| D566,200 S | 4/2008 | Seckel et al. |
| 7,357,209 B2 | 4/2008 | Kokatsu et al. |
| 7,370,720 B2 | 5/2008 | Kokatsu et al. |
| 7,389,836 B2 | 6/2008 | Johnson et al. |
| 7,411,366 B2 | 8/2008 | Kang et al. |
| D579,061 S | 10/2008 | Brockmeyer |
| 7,487,977 B2* | 2/2009 | Johnson ............... B62B 3/007 280/47.34 |
| 7,490,684 B2 | 2/2009 | Seymour et al. |
| 7,493,979 B2 | 2/2009 | Johnson et al. |
| D594,069 S | 6/2009 | Schlegel |
| 7,562,729 B2 | 7/2009 | Hammerle |
| 7,568,714 B2 | 8/2009 | Sasnowski et al. |
| 7,581,748 B2 | 9/2009 | Reimers |
| 7,584,985 B2 | 9/2009 | You et al. |
| 7,597,522 B2 | 10/2009 | Borntrager et al. |
| 7,604,079 B2 | 10/2009 | Pittman |
| 7,607,711 B2 | 10/2009 | Marshall |
| 7,641,285 B2 | 1/2010 | Jacobs |
| 7,704,035 B2 | 4/2010 | Borntrager et al. |
| 7,762,363 B1 | 7/2010 | Hirschfeld |
| 7,770,682 B2 | 8/2010 | Spanski |
| 7,779,948 B2 | 8/2010 | Gulas |
| 7,845,441 B2 | 12/2010 | Chambers |
| 7,886,853 B2 | 2/2011 | Konopa |
| 7,926,599 B2 | 4/2011 | Meyers |
| D652,084 S | 1/2012 | Herlitz |
| 8,120,190 B2 | 2/2012 | Bravo |
| 8,167,061 B2 | 5/2012 | Scheuerman et al. |
| 8,186,931 B2 | 5/2012 | Borntrager et al. |
| 8,251,389 B2 | 8/2012 | Juan |
| 8,276,692 B1 | 10/2012 | Nwaeke |
| 8,286,739 B2 | 10/2012 | Oliphant |
| 8,297,384 B2 | 10/2012 | Wanger et al. |
| 8,336,654 B1 | 12/2012 | Licon |
| 8,365,850 B2 | 2/2013 | Gal et al. |
| D679,338 S | 4/2013 | Ewringmann |
| 8,453,771 B1 | 6/2013 | Hirschfeld |
| 8,490,732 B2 | 7/2013 | Suigmoto et al. |
| 8,511,406 B2 | 8/2013 | Anasiewicz |
| 8,523,193 B1* | 9/2013 | Mucaro ............... B62B 5/082 280/7.15 |
| 8,532,857 B2 | 9/2013 | Hsu et al. |
| D693,886 S | 11/2013 | Blumenthal |
| 8,573,338 B2 | 11/2013 | Gal et al. |
| 8,573,346 B2 | 11/2013 | Duignan |
| 8,596,389 B2 | 12/2013 | Anasiewicz |
| 8,616,321 B2 | 12/2013 | Aoki et al. |
| 8,636,095 B2 | 1/2014 | Ito |
| 8,640,805 B2 | 2/2014 | Kuroki |
| 8,651,215 B2 | 2/2014 | Ogura |
| 8,655,531 B2 | 2/2014 | Saida |
| 8,660,728 B2 | 2/2014 | Saida |
| 8,662,232 B2 | 3/2014 | Nakamura et al. |
| 8,672,081 B2 | 3/2014 | Kume et al. |
| 8,684,122 B2 | 4/2014 | Maeno et al. |
| 8,689,921 B2 | 4/2014 | Aoki et al. |
| 8,708,084 B2 | 4/2014 | Kuroki et al. |
| 8,725,340 B1 | 5/2014 | Hosaka et al. |
| 8,746,377 B1 | 6/2014 | Dunbar |
| 8,746,710 B2 | 6/2014 | Schejbal |
| 8,777,804 B2 | 7/2014 | Takachi |
| 8,781,663 B2 | 7/2014 | Watarai |
| 8,794,368 B2 | 8/2014 | Gu et al. |
| D713,895 S | 9/2014 | Blumenthal |
| 8,820,459 B2 | 9/2014 | Hashimoto et al. |
| 8,820,461 B2 | 9/2014 | Shinde et al. |
| 8,831,810 B2 | 9/2014 | Shoge et al. |
| 8,851,215 B2 | 10/2014 | Goto |
| 8,886,426 B2 | 11/2014 | Cheng |
| 8,892,279 B2 | 11/2014 | Aoki et al. |
| 8,925,661 B2 | 1/2015 | Minoshima et al. |
| 8,936,129 B2 | 1/2015 | Honda et al. |
| 8,958,935 B2 | 2/2015 | Shoge |
| 8,972,086 B2 | 3/2015 | Komatsu |
| 9,033,347 B1 | 5/2015 | Westrate et al. |
| 9,045,152 B2 | 6/2015 | Sekine et al. |
| 9,073,601 B2 | 7/2015 | Carolin |
| 9,079,634 B2 | 7/2015 | Stieger |
| 9,085,342 B2 | 7/2015 | Jauvtis |
| D738,436 S | 9/2015 | Cummings |
| 9,145,154 B1 | 9/2015 | Horowitz |
| D748,739 S | 2/2016 | Horowitz |
| D782,371 S | 3/2017 | Clark |
| D782,580 S | 3/2017 | Herlitz |
| D794,133 S | 8/2017 | Ostergaard |
| D813,106 S | 3/2018 | Hopkins et al. |
| D827,722 S | 9/2018 | Sun |
| D827,939 S | 9/2018 | Jakubowski et al. |
| 10,081,380 B2 | 9/2018 | Fitzwater et al. |
| D836,498 S | 12/2018 | Hauser et al. |
| D840,280 S | 2/2019 | Shou |
| 2002/0084119 A1 | 7/2002 | Brabetz et al. |
| 2002/0148658 A1 | 10/2002 | Li |
| 2004/0026144 A1 | 2/2004 | Lan |
| 2004/0144585 A1 | 7/2004 | Vasser |
| 2004/0206563 A1 | 10/2004 | Murata |
| 2004/0216933 A1 | 11/2004 | Coale |
| 2004/0245745 A1 | 12/2004 | Vasser |
| 2005/0230928 A1 | 10/2005 | Raney |
| 2005/0275195 A1 | 12/2005 | Matula |
| 2005/0279537 A1 | 12/2005 | Nguyen |
| 2006/0037796 A1 | 2/2006 | Naegeli |
| 2006/0070784 A1 | 4/2006 | Tahara |
| 2006/0151224 A1 | 7/2006 | Vasser |
| 2006/0254831 A1 | 11/2006 | Kamei et al. |
| 2007/0034424 A1 | 2/2007 | Snowden et al. |
| 2007/0089917 A1 | 4/2007 | Hartley |
| 2007/0131462 A1 | 6/2007 | Hemsley |
| 2007/0194542 A1 | 8/2007 | Dixon |
| 2007/0252452 A1 | 11/2007 | Ishimoto et al. |
| 2007/0269300 A1 | 11/2007 | Menard |
| 2008/0041644 A1 | 2/2008 | Tudek et al. |
| 2008/0073880 A1 | 3/2008 | Bess |
| 2008/0122191 A1* | 5/2008 | Johnson ............... B62B 3/007 280/47.38 |
| 2008/0197608 A1 | 8/2008 | Dixon |
| 2009/0014219 A1 | 1/2009 | Springston et al. |
| 2009/0218154 A1 | 9/2009 | Yee |
| 2009/0266636 A1 | 10/2009 | Naegeli |
| 2010/0123294 A1 | 5/2010 | Ellington et al. |
| 2010/0156069 A1* | 6/2010 | Chen ................. B62B 3/007 280/639 |
| 2010/0181130 A1 | 7/2010 | Chou |
| 2010/0307851 A1 | 12/2010 | Spanski |
| 2011/0160945 A1 | 6/2011 | Gale |
| 2011/0232985 A1 | 9/2011 | Lee |
| 2012/0012409 A1 | 1/2012 | Turner et al. |
| 2012/0145469 A1 | 6/2012 | Tong |
| 2012/0160577 A1 | 6/2012 | Anasiewicz |
| 2012/0248722 A1* | 10/2012 | Herlitz ............... B62B 3/007 280/47.34 |
| 2012/0316709 A1 | 12/2012 | Saida |
| 2013/0068549 A1 | 3/2013 | Laprade |
| 2013/0179016 A1 | 7/2013 | Gale |
| 2014/0062351 A1 | 3/2014 | Spelta et al. |
| 2014/0166383 A1 | 6/2014 | Arimune |
| 2014/0166385 A1 | 6/2014 | Arimune et al. |
| 2014/0196968 A1 | 7/2014 | Bieler et al. |
| 2014/0216837 A1 | 8/2014 | Hsu |
| 2014/0222268 A1 | 8/2014 | Tsuchizawa |
| 2014/0230149 A1 | 8/2014 | Schejbal |
| 2014/0246261 A1 | 9/2014 | Sekine et al. |
| 2014/0251704 A1 | 9/2014 | Sekine et al. |
| 2014/0264207 A1 | 9/2014 | Sekine et al. |
| 2014/0358344 A1 | 12/2014 | Katayama |
| 2014/0365013 A1 | 12/2014 | Kruse |
| 2014/0366501 A1 | 12/2014 | Goto |
| 2015/0039165 A1 | 2/2015 | Fujita et al. |
| 2015/0053042 A1 | 2/2015 | Shirakawa et al. |
| 2015/0136509 A1 | 5/2015 | Tanaka et al. |
| 2015/0145224 A1 | 5/2015 | Zhu |

(56) References Cited

U.S. PATENT DOCUMENTS

| | | |
|---|---|---|
| 2015/0151771 A1 | 6/2015 | Jin |
| 2015/0158550 A1 | 6/2015 | Kawakami et al. |
| 2015/0191215 A1 | 7/2015 | Kawakami et al. |
| 2016/0347338 A1 | 12/2016 | Vargas, II |
| 2017/0334474 A1* | 11/2017 | Bowman .................. B62B 3/02 |
| 2018/0118243 A1* | 5/2018 | Fitzwater ................ B62B 7/008 |

* cited by examiner

FOLDABLE WAGON

CROSS-REFERENCE TO RELATED APPLICATIONS

This application claims the benefit of U.S. Provisional Patent Application No. 62/416,382, filed Nov. 2, 2016, which is expressly incorporated herein by reference and made a part hereof.

FEDERALLY SPONSORED RESEARCH OR DEVELOPMENT

Not Applicable.

TECHNICAL FIELD

The present disclosure relates generally to wagons, and more specifically to a foldable wagon that converts from a use configuration to a folded storage configuration.

BACKGROUND

Wagons, including folding wagons, are well known in the art. While such wagons according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a folding wagon that is configurable in a use configuration and folded configuration.

The disclosed technology further relates to a foldable wagon configurable in a use configuration and folded configuration, the foldable wagon comprising: a front frame assembly comprising a first front side assembly, a second front side assembly spaced apart from the first front side assembly, a front frame joining the first front side assembly and the second front side assembly, a front foot well support between the first front side assembly and the second front side assembly, and a front seat between the first front side assembly and the second front side assembly; a rear frame assembly comprising a first rear side assembly, a second rear side assembly spaced apart from the first rear side assembly, a rear frame joining the first rear side assembly and the second rear side assembly, a rear foot well support between the first rear side assembly and the second rear side assembly, and a rear seat between the first rear side assembly and the second rear side assembly; the first front side assembly having a first front seat linkage having a first end and a second end, the first end of the first front seat linkage pivotally connected to the front frame and the second end of the first front seat linkage pivotally connected to a first upper pivot bracket; the second front side assembly having a second front seat linkage having a first end and a second end, the first end of the second front seat linkage pivotally connected to the front frame and the second end of the second front seat linkage pivotally connected to a second upper pivot bracket; the first rear side assembly having a first rear seat linkage having a first end and a second end, the first end of the first rear seat linkage pivotally connected to the rear frame and the second end of the first rear seat linkage pivotally connected to the first upper pivot bracket; the second rear side assembly having a second rear seat linkage having a first end and a second end, the first end of the second rear seat linkage pivotally connected to the rear frame and the second end of the second rear seat linkage pivotally connected to the second upper pivot bracket; a first front armrest pivotally connected to the front frame, and a first front vertical linkage having a first end and a second end, the first end of the first front vertical linkage pivotally connected to the first front armrest and the second end of the first front vertical linkage pivotally connected to the front foot well support; a second front armrest pivotally connected to the front frame, and a second front vertical linkage having a first end and a second end, the first end of the second front vertical linkage pivotally connected to the second front armrest and the second end of the second front vertical linkage pivotally connected to the front foot well support; a first rear armrest pivotally connected to the rear frame, and a first rear vertical linkage having a first end and a second end, the first end of the first rear vertical linkage pivotally connected to the first rear armrest and the second end of the first rear vertical linkage pivotally connected to the rear foot well support; a second rear armrest pivotally connected to the rear frame, and a second rear vertical linkage having a first end and a second end, the first end of the second rear vertical linkage pivotally connected to the second rear armrest and the second end of the second rear vertical linkage pivotally connected to the rear foot well support; a first lower pivot bracket and a second lower pivot bracket, the first lower pivot bracket pivotally connected to a first side of the front foot well assembly and pivotally connected to a first side of the rear foot well assembly, and the second lower pivot bracket pivotally connected to a second side of the front foot well assembly and pivotally connected to a second side of the rear foot well assembly; a first center linkage connected to the first upper pivot bracket and the first lower pivot bracket; and, a second center linkage connected to the second upper pivot bracket and the second lower pivot bracket.

The disclosed technology further relates to a foldable wagon configurable in a use configuration and folded configuration, the foldable wagon comprising: a front frame assembly; a rear frame assembly; a first upper pivot bracket connecting an upper portion of the front frame assembly to an upper portion of the rear frame assembly; a first lower pivot bracket connecting a lower portion of the front frame assembly to a lower portion of the rear frame assembly; a timing member further connecting the front frame assembly to the rear frame assembly; and, a footrest covering a portion of the front frame assembly and a portion of the rear frame assembly, the footrest having a first end connected to the rear frame assembly and a second end free from connection to the front frame assembly, wherein when the second end of the footrest is raised the rear frame assembly and the front frame assembly begin to pivot the foldable wagon from the use configuration to the folded configuration.

The disclosed technology further relates to a foldable wagon configurable in a use configuration and folded configuration, the foldable wagon comprising: a front frame assembly; a rear frame assembly; an upper pivot bracket pivotally connecting an upper portion of the front frame assembly to an upper portion of the rear frame assembly; a lower pivot bracket pivotally connecting a lower portion of the front frame assembly to a lower portion of the rear frame assembly; and, a timing member further connecting the front frame assembly to the rear frame assembly, the timing member comprising a first gear connected to the front frame assembly and a second gear connected to the rear frame assembly, the first gear mating with the second gear, wherein the timing member assists to maintain the front frame assembly synched with the rear frame assembly during folding and unfolding of the foldable wagon.

The disclosed technology further relates to a foldable wagon configurable in a use configuration and folded configuration, the foldable wagon comprising: a front frame assembly having a front seat and a front foot well support; a rear frame assembly having a rear seat and a rear foot well support; an upper pivot bracket pivotally connecting an upper portion of the front frame assembly to an upper portion of the rear frame assembly; a lower pivot bracket pivotally connecting a lower portion of the front frame assembly to a lower portion of the rear frame assembly; and, a footrest covering a portion of the front foot well support and a portion of the rear foot well support, the footrest having a first end connected to the rear foot well support and a second end free from connection to the front foot well support, wherein when the second end of the footrest is raised the rear frame assembly and the front frame assembly begin to pivot the foldable wagon from the use configuration to the folded configuration.

The disclosed technology further relates to a wagon having a front foldable seat backrest pivotally connected to the front frame assembly, and a rear foldable seat backrest pivotally connected to the rear frame assembly. In one embodiment, the front foldable seat backrest pivots between a raised position and a folded position.

The disclosed technology further relates to a wagon having a front fixed seat connected to the front frame assembly, and a rear fixed seat connected to the rear frame assembly.

The disclosed technology further relates to a wagon having a first timing member connecting the first side of the front foot well assembly to the first side of the rear foot well assembly, and a second timing member connecting the second side of the front foot well assembly to the second side of the rear foot well assembly. In one embodiment, the first timing member comprises a first gear connected to the first side of the front frame assembly and a second gear connected to the first side of the rear frame assembly, the first gear mating with the second gear, and wherein the second timing member comprises a first gear connected to the second side of the front frame assembly and a second gear connected to the second side of the rear frame assembly, the first gear mating with the second gear. In one embodiment, the timing member comprises a first gear connected to the front frame assembly and a second gear connected to the rear frame assembly, the first gear mating with the second gear.

The disclosed technology further relates to a wagon having a front frame assembly that comprises a first front side assembly spaced from a second front side assembly with a front frame and a front foot well support, and wherein the rear frame assembly comprises a first rear side assembly spaced from a second rear side assembly with a rear frame and a rear foot well support.

The disclosed technology further relates to a wagon having a first upper pivot bracket that pivotally connects the first front side assembly to the first rear side assembly, and further comprising a second upper pivot bracket pivotally connecting the second front side assembly to the second rear side assembly.

The disclosed technology further relates to a wagon having a first lower pivot bracket that pivotally connects the first front side assembly to the first rear side assembly, and further comprising a second lower pivot bracket pivotally connecting the second front side assembly to the second rear side assembly.

The disclosed technology further relates to a wagon having a first center linkage that connects the first upper pivot bracket to the first lower pivot bracket, and a second center linkage connecting the second upper pivot bracket to the second lower pivot bracket.

The disclosed technology further relates to a wagon having a front armrest pivotally connected to the front frame, a front vertical linkage having a first end and a second end, the first end of the front vertical linkage pivotally connected to the front armrest and the second end of the front vertical linkage pivotally connected to the front foot well support, a rear armrest pivotally connected to the rear frame, a rear vertical linkage having a first end and a second end, the first end of the rear vertical linkage pivotally connected to the rear armrest and the second end of the rear vertical linkage pivotally connected to the rear foot well support.

The disclosed technology further relates to a wagon having a front seat linkage having a first end and a second end, the first end of the front seat linkage pivotally connected to the front frame, the second end of the front seat linkage pivotally connected to the first upper pivot bracket, and the front vertical linkage pivotally connected to the front seat linkage between the first end and the second end of the front seat linkage, a rear seat linkage having a first end and a second end, the first end of the rear seat linkage pivotally connected to the rear frame, the second end of the rear seat linkage pivotally connected to the first upper pivot bracket, and the rear vertical linkage pivotally connected to the rear seat linkage between the first end and the second end of the rear seat linkage.

The disclosed technology further relates to a wagon having a pair of rotatable front wheels pivotally connected to the front frame assembly, and a pair of rotatable rear wheels connected to the rear frame assembly. In one embodiment, the pair of front wheels are connected to the front frame assembly exterior to a side of the front frame assembly, and wherein the pair of rear wheels are connected to the rear frame assembly interior to a side of the rear frame assembly.

The disclosed technology further relates to a wagon having a footrest having a first end and a second end, the first end of the footrest being connected to the rear foot well assembly between the first rear vertical linkage and the second rear vertical linkage, the second end of the footrest being positioned between the first front vertical linkage and the second front vertical linkage, the second end of the footrest being free from connection to the front foot well assembly, wherein when the second end of the footrest is raised the rear frame assembly and the front frame assembly begin to pivot the foldable wagon from the use configuration to the folded configuration. In one embodiment, the footrest has a handle adjacent the second end of the footrest.

The disclosed technology further relates to a wagon having a first front vertical linkage that is pivotally connected to the first front seat linkage, a second front vertical linkage that is pivotally connected to the second front seat linkage, a first rear vertical linkage that is pivotally connected to the first rear seat linkage, and a second rear vertical linkage that is pivotally connected to the second rear seat linkage.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
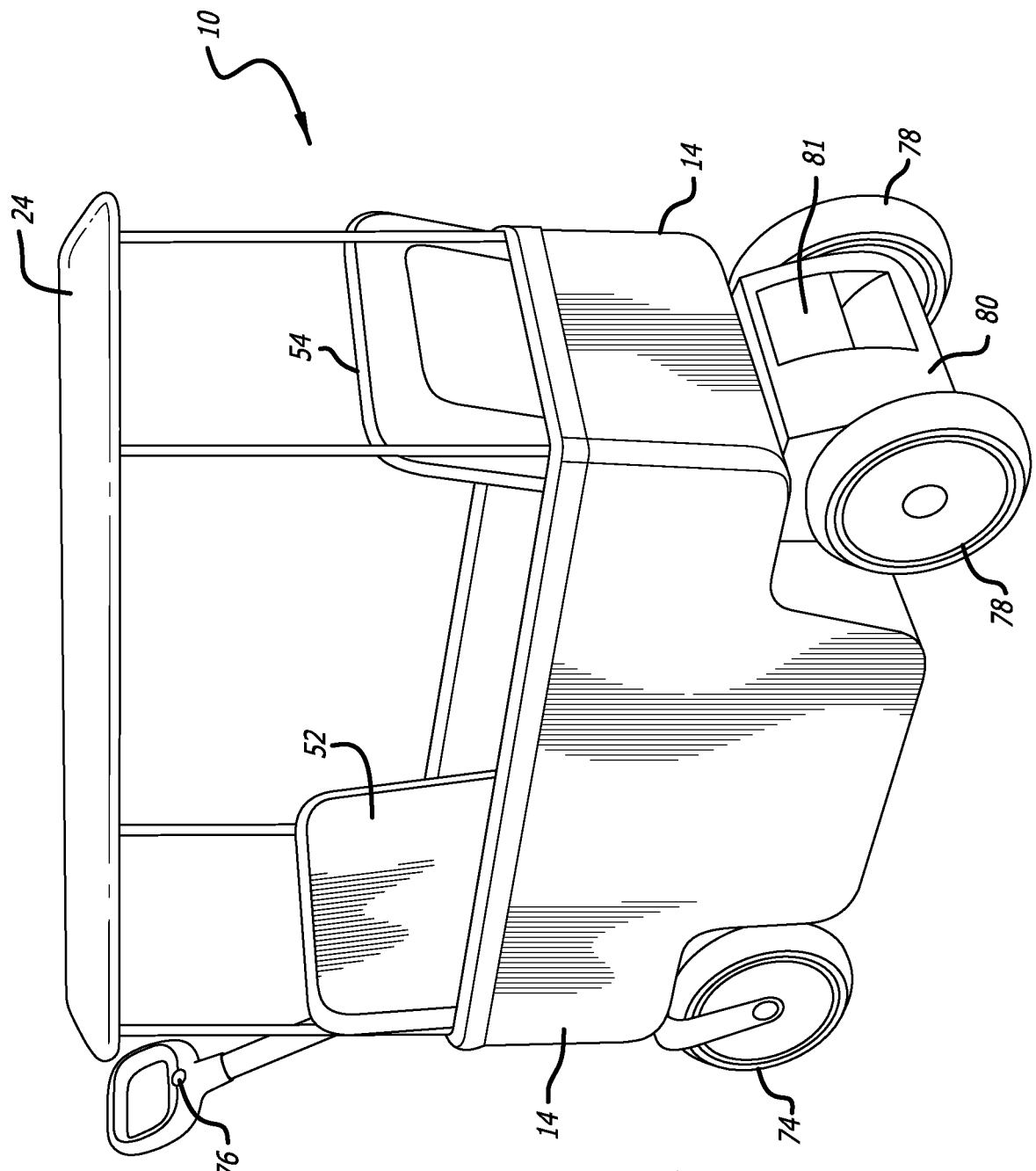
FIG. 1 is a top perspective rear view of a foldable wagon according to one embodiment, showing the foldable wagon in an unfolded or use configuration and with a housing structure on the wagon.

While the foldable wagon discussed herein is susceptible of embodiments in many different forms, there is shown in the drawings, and will herein be described in detail, preferred embodiments with the understanding that the present description is to be considered as an exemplification of the principles of the foldable wagon and are not intended to limit the broad aspects of the disclosure to the embodiments illustrated.

Figure 2:
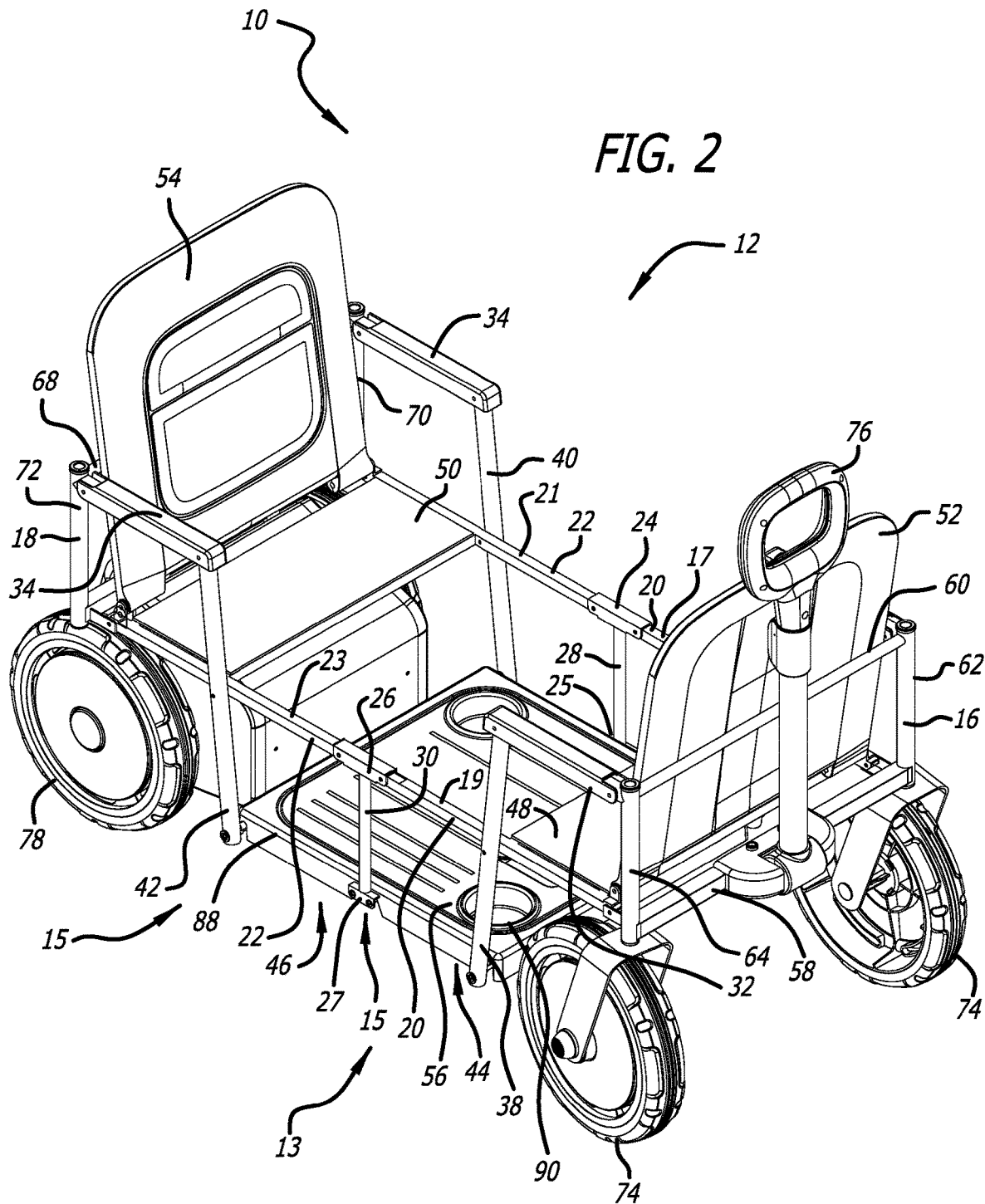
FIG. 2 is a top perspective front view of the foldable wagon of FIG. 1 with a housing structure removed to reveal additional frame structure.

Referring now to the figures, and initially to FIGS. 1 and 2, in one embodiment a foldable wagon 10 includes a collapsible frame assembly 12 that is moveable and configurable between an unfolded or use configuration (FIGS. 1-6) and a collapsed or folded configuration (FIGS. 7-12). In one embodiment, the foldable wagon 10 also includes a housing assembly 14 that defines sidewalls of the wagon 10. In a preferred embodiment, the housing assembly 14 is preferably made of a flexible material, such as fabric, and is therefore referred to as the fabric assembly 14.

The foldable wagon 10 is shown with the housing assembly 14 (FIG. 1), and without the housing assembly 14 (FIGS. 2-12), to better disclose the collapsible frame assembly 12. The flexible housing 14 is preferably secured about a perimeter of the foldable wagon 10, either inside of the collapsible frame 12, outside the collapsible frame 12 or both inside and outside the collapsible frame 12.

In one embodiment, as best shown in FIG. 2, the collapsible frame assembly 12 comprises a front frame assembly 13 and a rear frame assembly 15. The front frame assembly 13 may comprise, among other structure, a first front side assembly 17, a second front side assembly 19 spaced apart from the first front side assembly 17, and a front frame 16 joining the first front side assembly 17 and the second front side assembly 19. The rear frame assembly 15 may comprise, among other structure, a first rear side assembly 21, a second rear side assembly 23 spaced apart from the first rear side assembly 21, and a rear frame 18 joining the first rear side assembly 21 and the second rear side assembly 23.

In various embodiments the frame assembly 12 also comprises first and second front seat linkages 20 having first and second ends, and first and second rear seat linkages 22 having first and second ends. The first end of the first front seat linkage 20 is preferably pivotally connected to the front frame 16, and the first end of the second front seat linkage 20 is pivotally connected to the front frame 16. Further, the second end of the first front seat linkage 20 is preferably pivotally connected to a first upper pivot bracket 24, and the second end of the second front seat linkage 20 is preferably pivotally connected to a second upper pivot bracket 26. The first end of the rear seat linkage 22 is preferably pivotally connected to the rear frame 18, and the first end of the second rear seat linkage 22 is preferably pivotally connected to the rear frame 18. Further, the second end of the first rear seat linkage 22 is preferably pivotally connected to the first upper pivot bracket 24, and the second end of the second rear seat linkage 22 is preferably pivotally connected to the second upper pivot bracket 26. Accordingly, the first upper pivot bracket 24 joins the first front seat linkage 20 and the first rear seat linkage 22 (i.e., an upper portion of the front frame assembly 13 to an upper portion of the rear frame assembly 15), and the second upper pivot bracket 26 joins the second front seat linkage 20 and the second rear seat linkage 22 (i.e., an upper portion of the front frame assembly 13 to an upper portion of the rear frame assembly 15).

As shown in FIG. 2, a first center linkage 28 extends from the first upper pivot bracket 24 to a first lower pivot bracket 25, and a second center linkage 30 extends from the second upper pivot bracket 26 to a second lower pivot bracket 27. The first lower pivot bracket 25 pivotally connects a first side of a front foot well support 44 to a first side of a rear foot well support 46 (i.e., a lower portion of the front frame assembly 13 to a lower portion of the rear frame assembly 15), and the second lower pivot bracket 27 pivotally connects a second side of the front foot well support 44 to a second side of the rear foot well support 46 (i.e., a lower portion of the front frame assembly 13 to a lower portion of the rear frame assembly 15). In a preferred embodiment the front foot well support 44 is provided between the first front side assembly 17 and the second front side assembly 19, and the rear foot well support 46 is provided between the first rear side assembly 21 and the second rear side assembly 23. Accordingly, in one embodiment, the frame structure extending from the front frame 16 to the first and second center linkages 28, 30 is referred to as the front frame assembly 13, and the frame structure extending from the rear frame 18 to the first and second center linkages 28, 30 is referred to as the rear frame assembly 15.

The frame assembly 12 may also have first and second front armrests 32, and first and second rear armrests 34. The first front armrest 32 is preferably pivotally connected to the front frame 16, and the second front armrest 32 is similarly preferably pivotally connected to the front frame 16. Similarly, the first rear armrest 34 is preferably pivotally connected to the rear frame 18, and the second rear armrest 34 is preferably pivotally connected to the rear frame 18. A first front vertical linkage 36 is provided that has a first end and a second end. The first end of the first front vertical linkage 36 is pivotally connected to the first front armrest 32 and the second end of the first front vertical linkage 36 is pivotally connected to the front foot well support 44. A second front vertical linkage 38 is provided that has a first end and a second end. The first end of the second front vertical linkage 38 is pivotally connected to the second front armrest 32 and the second end of the second front vertical linkage 38 is pivotally connected to the front foot well support 44. A first rear vertical linkage 40 is provided that has a first end and a second end. The first end of the first rear vertical linkage 40 is pivotally connected to the first rear armrest 34 and the second end of the first rear vertical linkage 40 is pivotally connected to the rear foot well support 46. A second rear vertical linkage 42 is provided that has a first end and a second end. The first end of the second rear vertical linkage 42 is pivotally connected to the first rear armrest 34 and the second end of the second rear vertical linkage 42 is pivotally connected to the rear foot well support 46. The collapsible frame assembly 12 also comprises a footrest 56 over the front and rear foot well supports 44, 46. The footrest 56 preferably covers a portion of the front frame assembly and a portion of the rear frame assembly.

The collapsible frame assembly 12 may also comprise a front seat 48 between the first front side assembly 17 and the second front side assembly 19, and a rear seat 50 between the first rear side assembly 21 and the second rear side assembly 23. In an alternate embodiment, the frame assembly 12 has a front backrest 52 and a rear backrest 54. As best shown in FIG. 2, in one embodiment the front seat 48 is fixedly connected to fixed supports 82 extending between the first front seat linkage 20 and the second front seat linkage 20. Similarly, in one embodiment, the rear seat 50 is fixedly connected to fixed supports 84 extending between the first rear seat linkage 22 and the second rear seat linkage 22. While the seat bottoms 48 and 50 are fixed in place, in a preferred embodiment the backrests 52 and 54 are pivotally connected to the wagon frame assembly 12 to be able to move between a raised and folded position. Specifically, in one embodiment the front backrest 52 is pivotally connected to the front frame assembly at the first and second front seat linkages 20, and the rear backrest 54 is pivotally connected to the rear frame assembly at the first and second rear seat linkages 22. The front and rear backrests 52, 54 can be pivoted toward the footrest 56 so that they lay flat against the seats 48, 50.

In one embodiment the front frame 16 is a box-like structure and comprises a lower horizontal member 58, an upper horizontal member 60, a first vertical support 62 and a second vertical support 64. Two front caster wheel assemblies 74 to allow for steering of the wagon 10 are preferably connected to the front frame 16. In an alternate embodiment, as shown in FIGS. 13-16, the front caster wheel assemblies 74 may be connected to the front frame 16 exterior to the side of the front frame assembly so that the front wheels 74 nest outside of the rear wheels 78 in the folded configuration. Additionally, additional support is provided for the wagon 10 by having the front wheels further outward. A pull handle 76 is also connected to the front frame 16.

Figure 3:
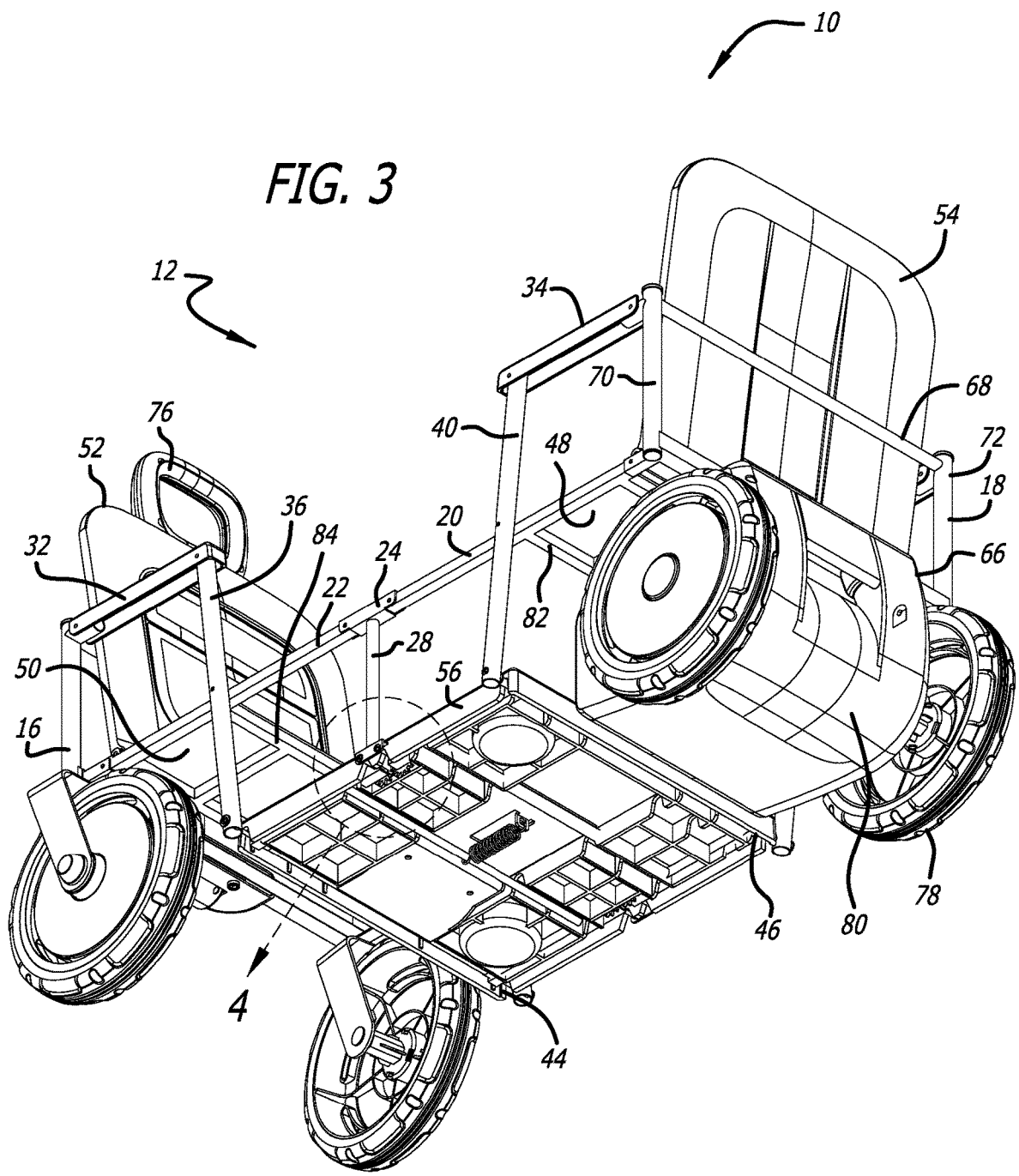
FIG. 3 is a bottom perspective rear view of the foldable wagon of FIG. 1 with a housing structure removed to reveal additional frame structure.
Figure 9:
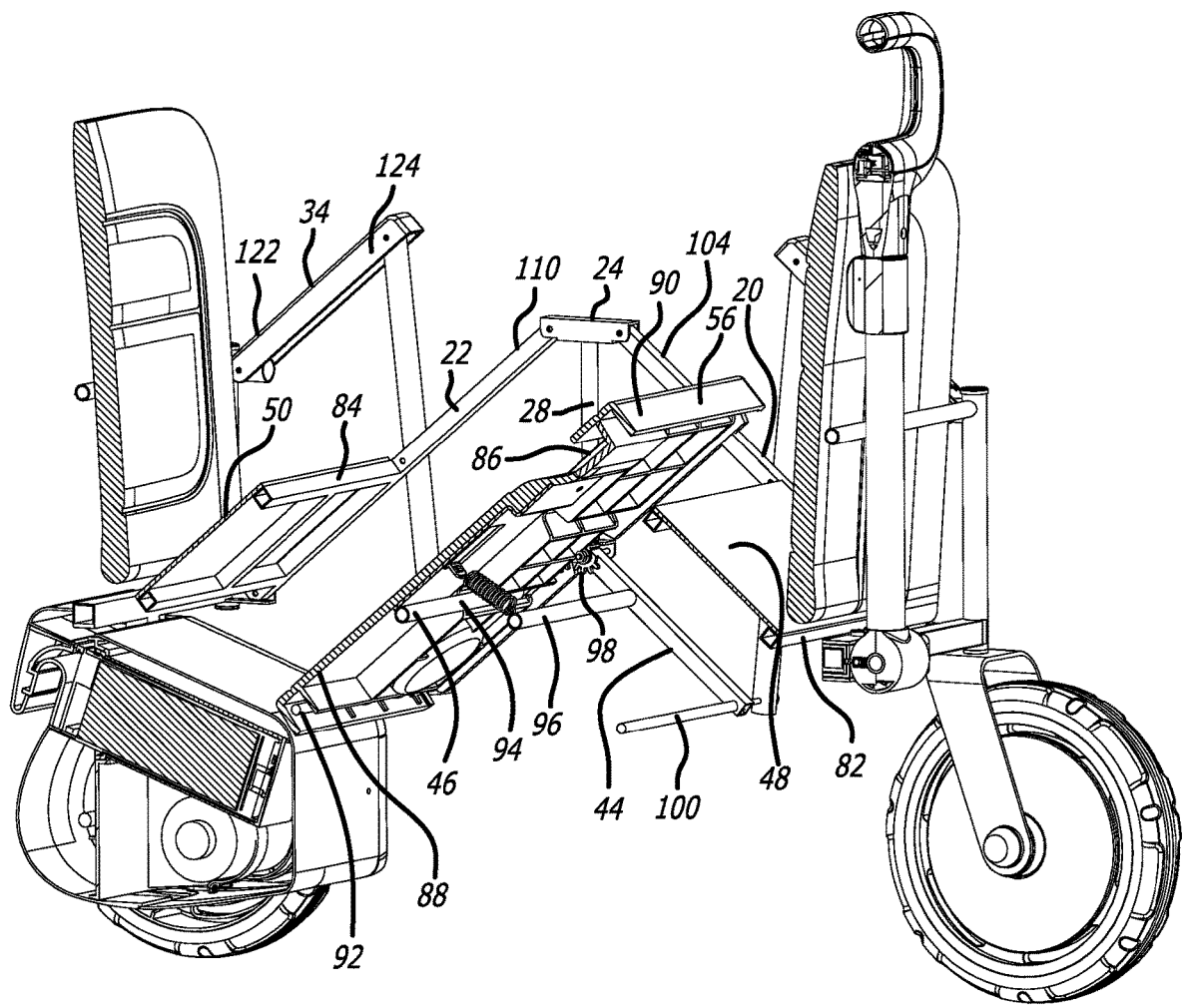
FIG. 9 is a cross-sectional perspective view about line 9-9 of FIG. 7.
Figure 10:
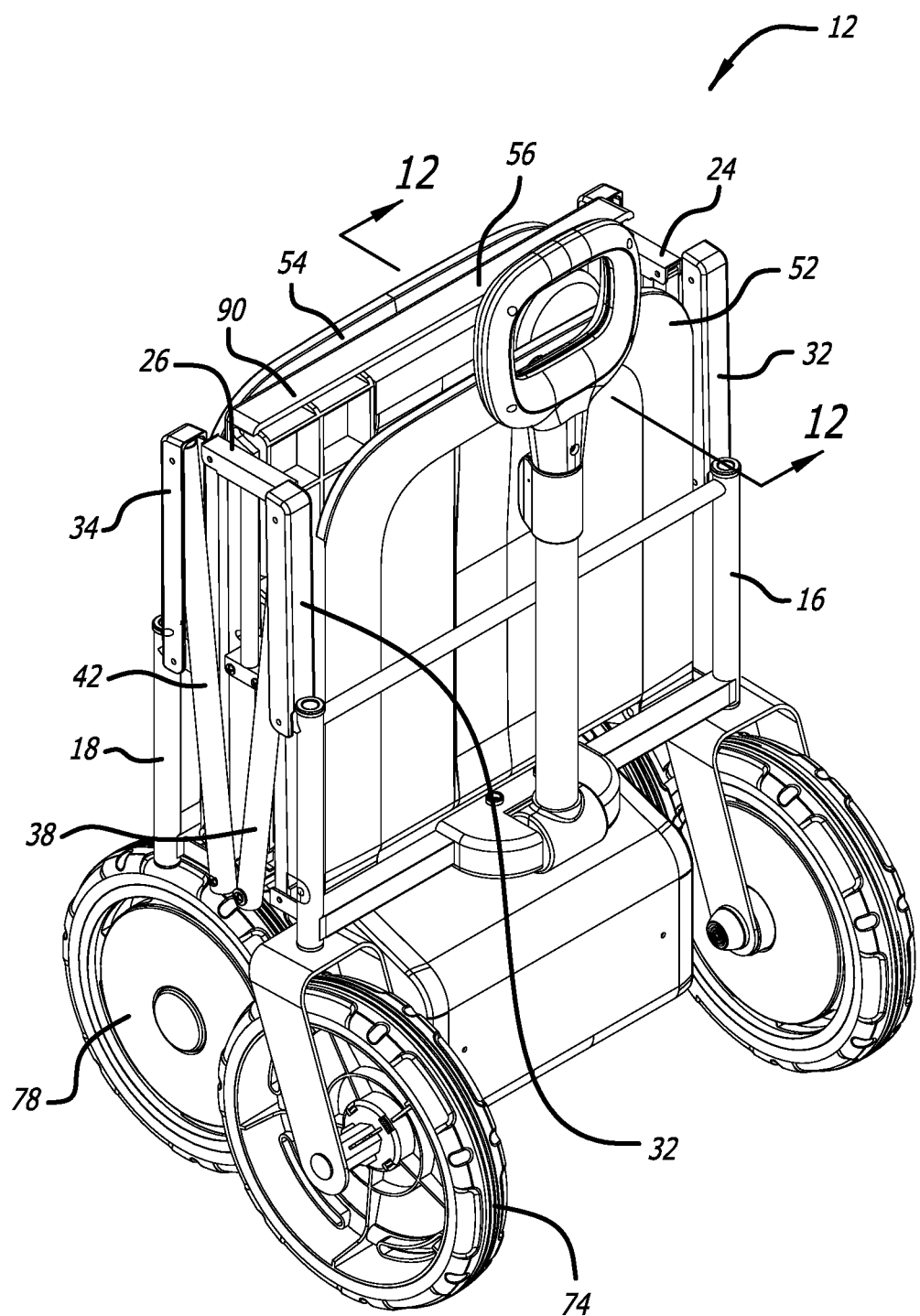
FIG. 10 is a perspective view of the foldable wagon of FIG. 1 in the folded configuration and with the housing structure removed.
Figure 11:
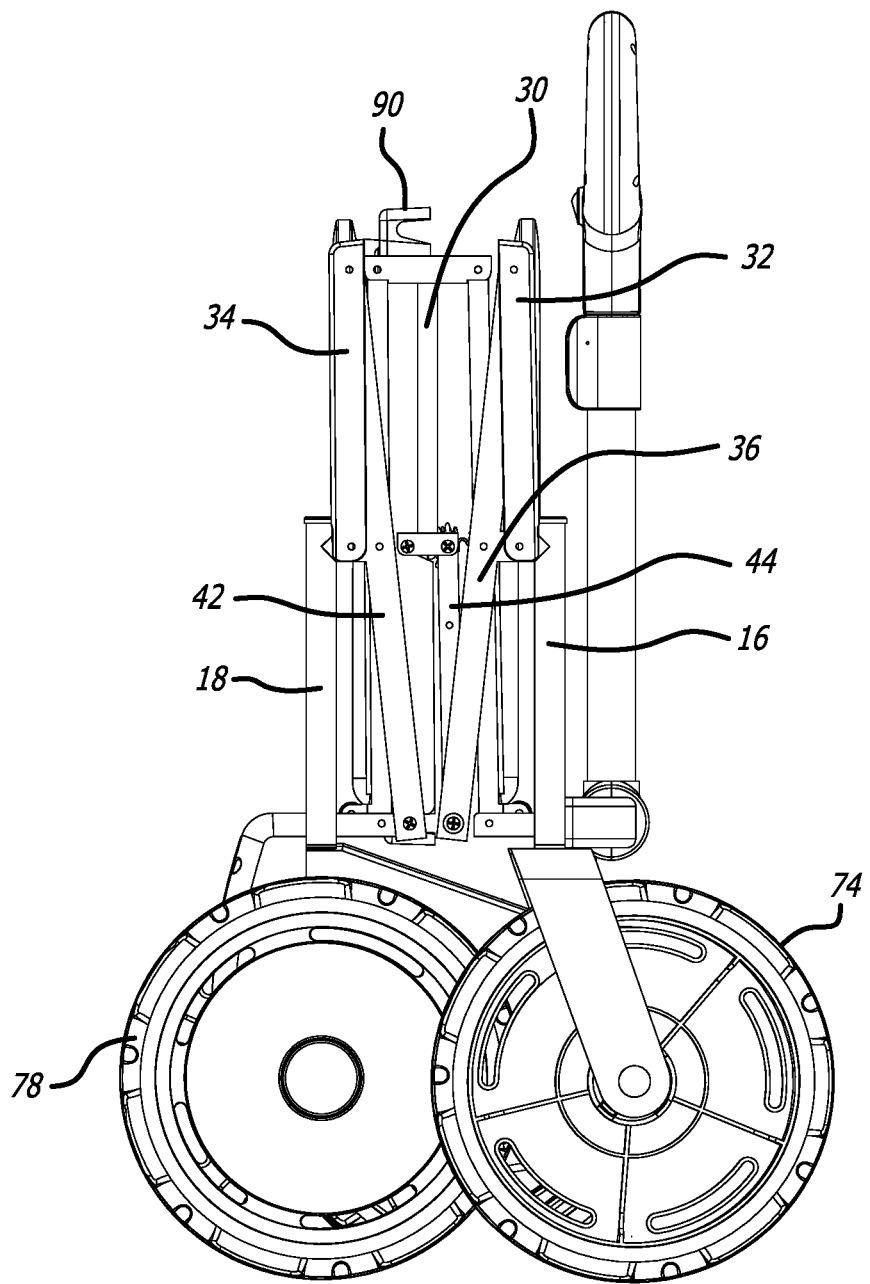
FIG. 11 is a side view of the foldable wagon of FIG. 10 in the folded configuration.

As shown in FIGS. 2 and 3, in one embodiment the rear frame 18 is also a box-like structure and comprises a lower horizontal member 66, an upper horizontal member 68, a first vertical support 70 and a second vertical support 72. Rear wheels 78 may be connected to the rear frame 18. In the embodiments shown, a drive assembly 80 is provided. The drive assembly 80 includes one or more motors (not shown), a motor controller (not shown), and a power supply 81. In this embodiment the rear wheels 78 are part of the drive assembly 80 that is connected to the rear frame 18. As best shown in FIGS. 10 and 11, the front wheels 74 are outboard of the rear wheels 78 to provide additional stability for the wagon 10 and also to provide clearance for each of the wheels during folding of the wagon 10 as shown in FIGS. 7-12. In one embodiment, the rear wheels are connected to the rear frame assembly interior to a side of the rear frame assembly.

As shown in FIGS. 2-3 and 7-9, the first and second rear vertical linkages 40, 42 are pivotally connected about a mid-location of the vertical linkages 40, 42 to the first and second rear seat linkages 22. Similarly, the first and second front vertical linkages 36, 38 are pivotally connected about a mid-location of the vertical linkages 36, 38 to the first and second front seat linkages 20.

Further, the first end 102 of each of the first and second front seat linkages 20 is pivotally connected to the front frame 16. The second end 104 of the first front seat linkage 20 is pivotally connected to the first pivot bracket 24, and the second end 106 of the second front seat linkage 20 is pivotally connected to the second pivot bracket 26. Similarly, the first end 108 of each of the first and second rear seat linkages 22 is pivotally connected to the rear frame 18. And, the second end 110 of the first rear seat linkage 22 is pivotally connected to the first pivot bracket 24, and the second end 112 of the second rear seat linkage 22 is pivotally connected to the second pivot bracket 26.

Referring to FIGS. 2, 3, 5 and 7-12, the front and rear armrests 32, 34 are also pivotally connected to the collapsible frame assembly 12. The first front armrest 32 is pivotally connected at its first end 114 to the front frame 16 and at its second end 116 to the first front vertical linkage 36. The second front armrest 32 is pivotally connected at its first end 118 to the front frame 16 and at its second end 120 to the second front vertical linkage 38. The first rear armrest 34 is pivotally connected at its first end 122 to the rear frame 18 and at its second end 124 to the first rear vertical linkage 40. The second rear armrest 34 is pivotally connected at its first end 126 to the rear frame 18 and at its second end 128 to the second rear vertical linkage 42.

Figure 4:
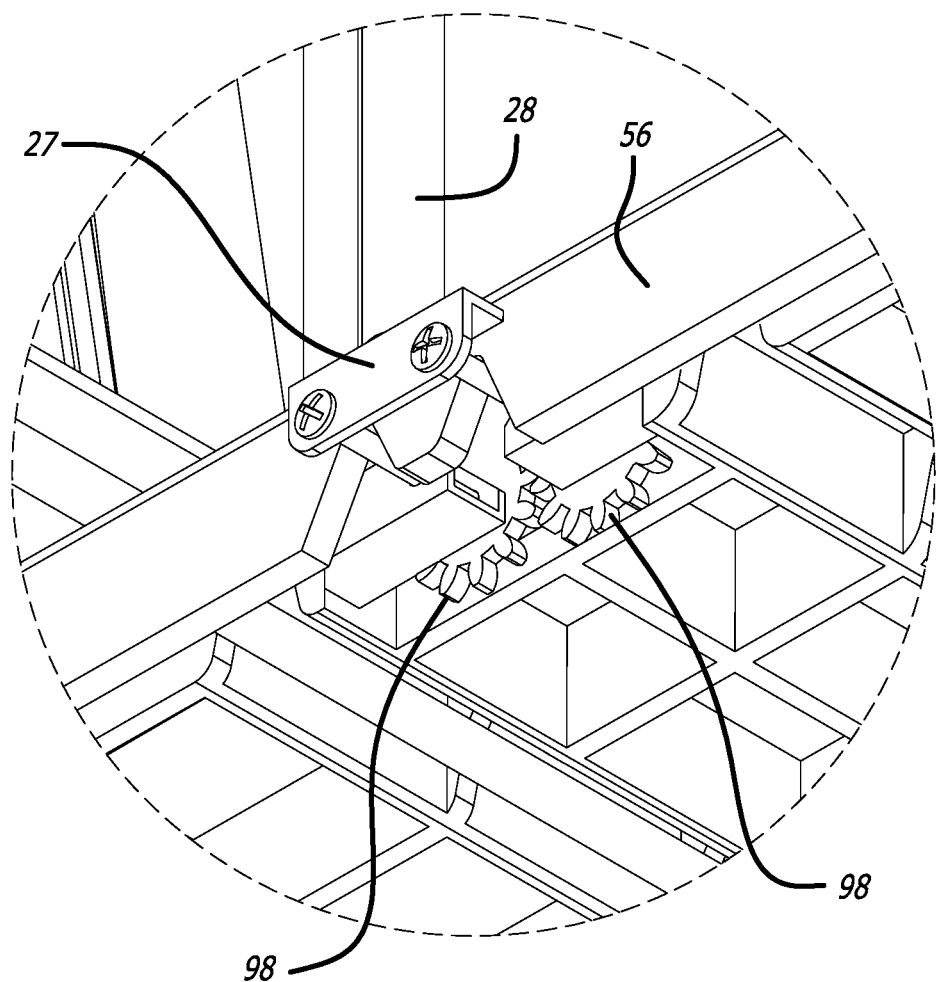
FIG. 4 is a partial perspective view of a folding mechanism for the foldable wagon of FIG. 1.
Figure 5:
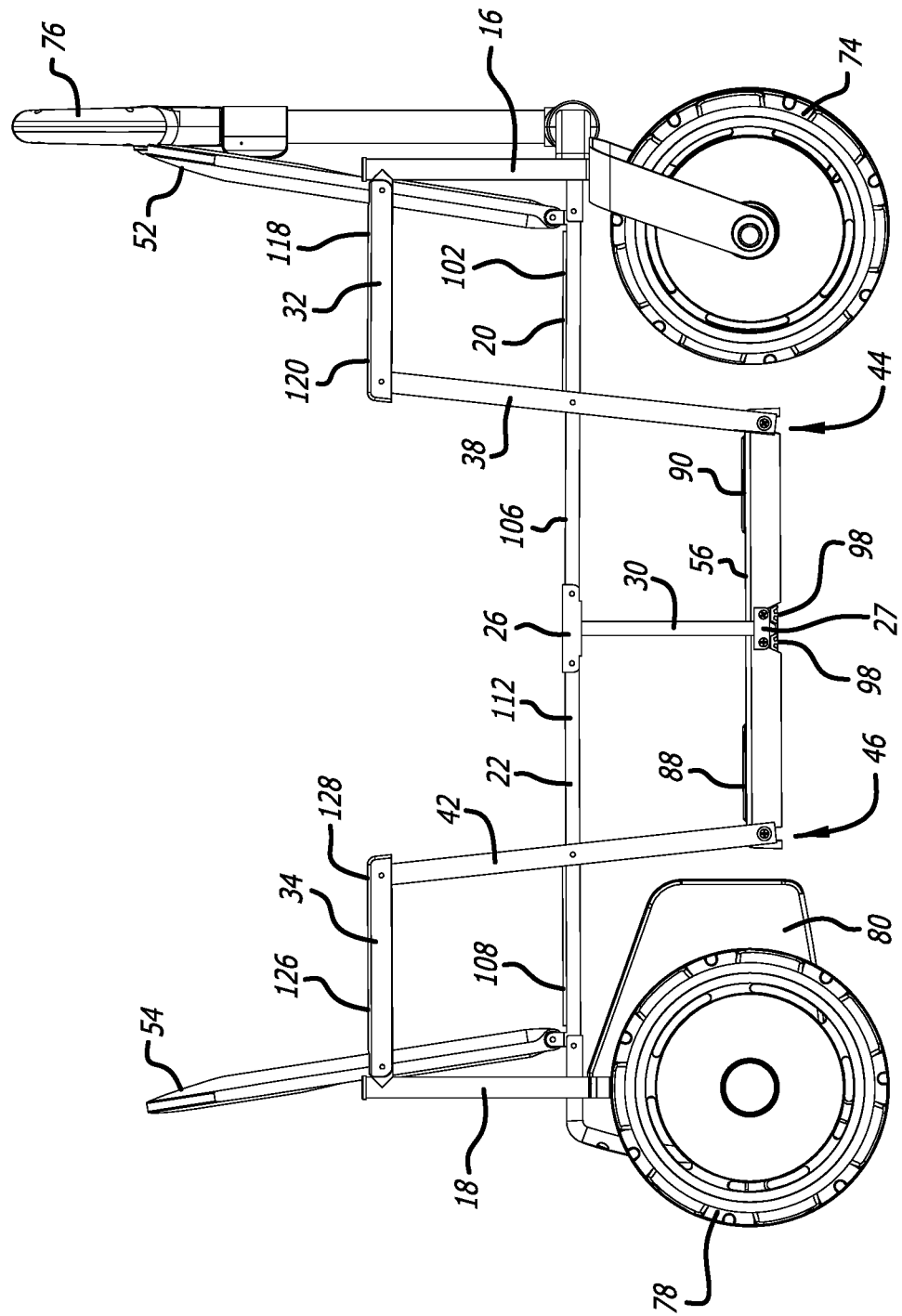
FIG. 5 is a side view of the foldable wagon of FIG. 1.
Figure 6:
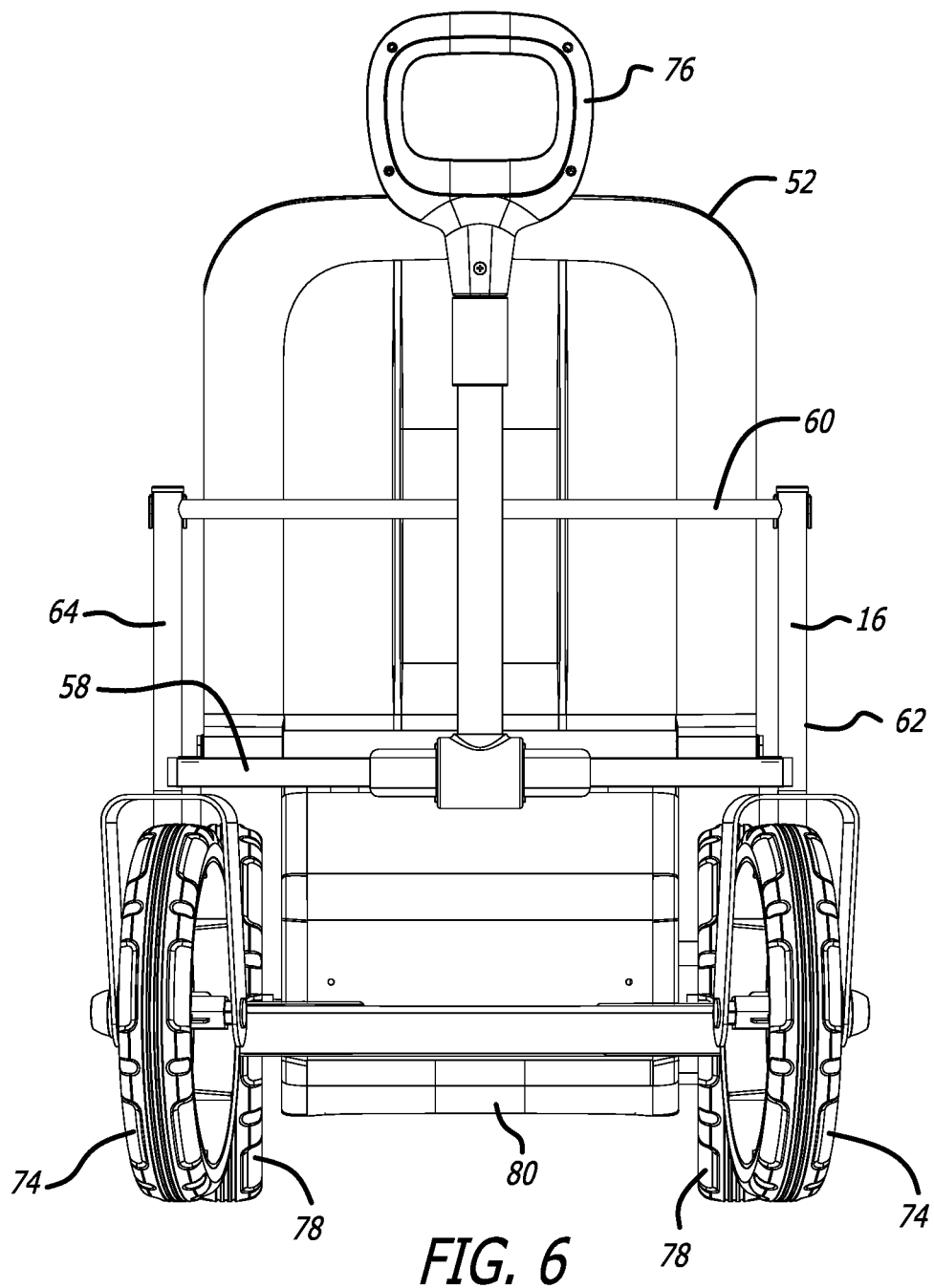
FIG. 6 is a front view of the foldable wagon of FIG. 1.
Figure 7:
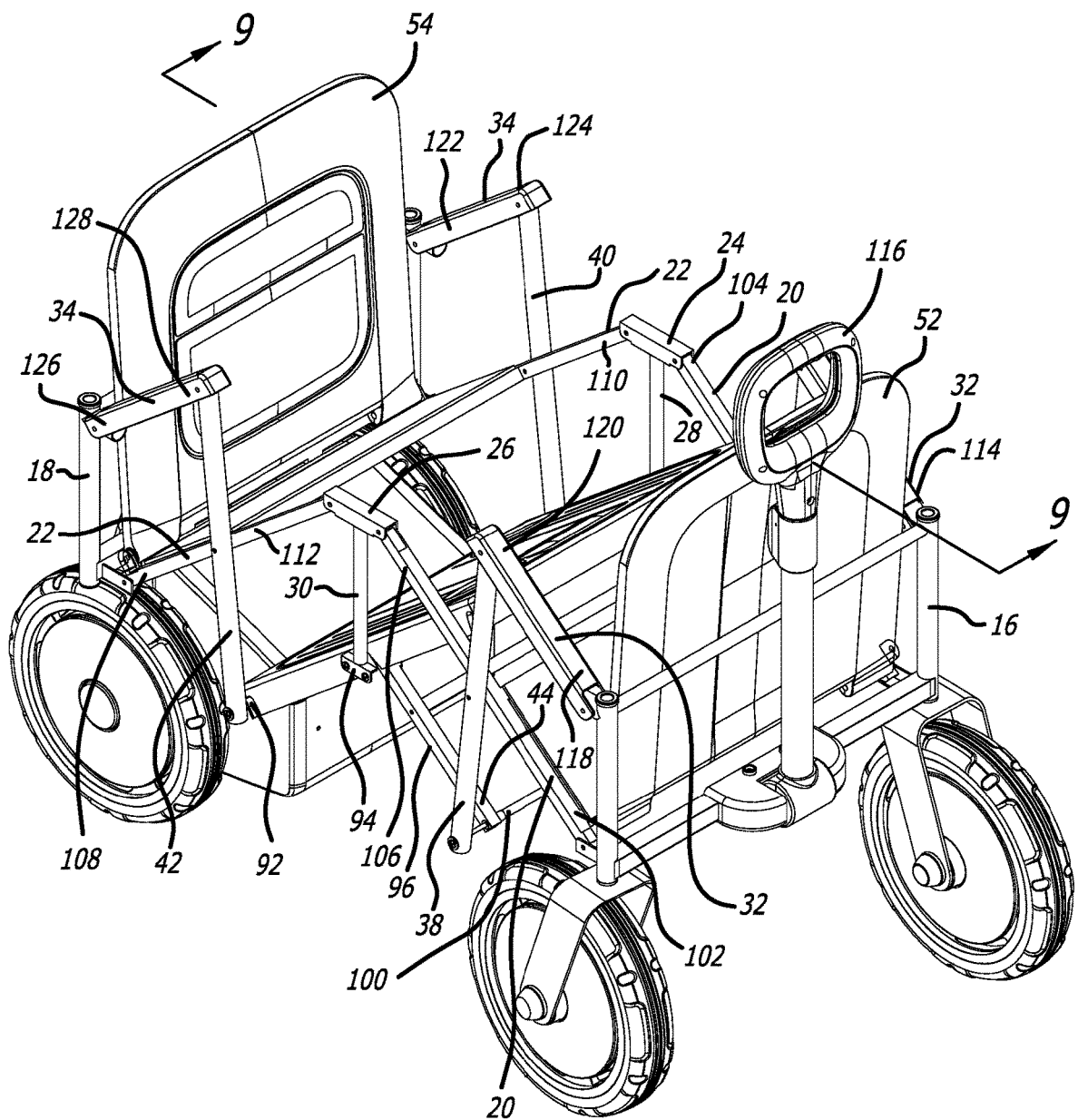
FIG. 7 is a perspective view of the foldable wagon of FIG. 1 with the housing structure removed and showing the foldable wagon in a partially folded configuration.
Figure 8:
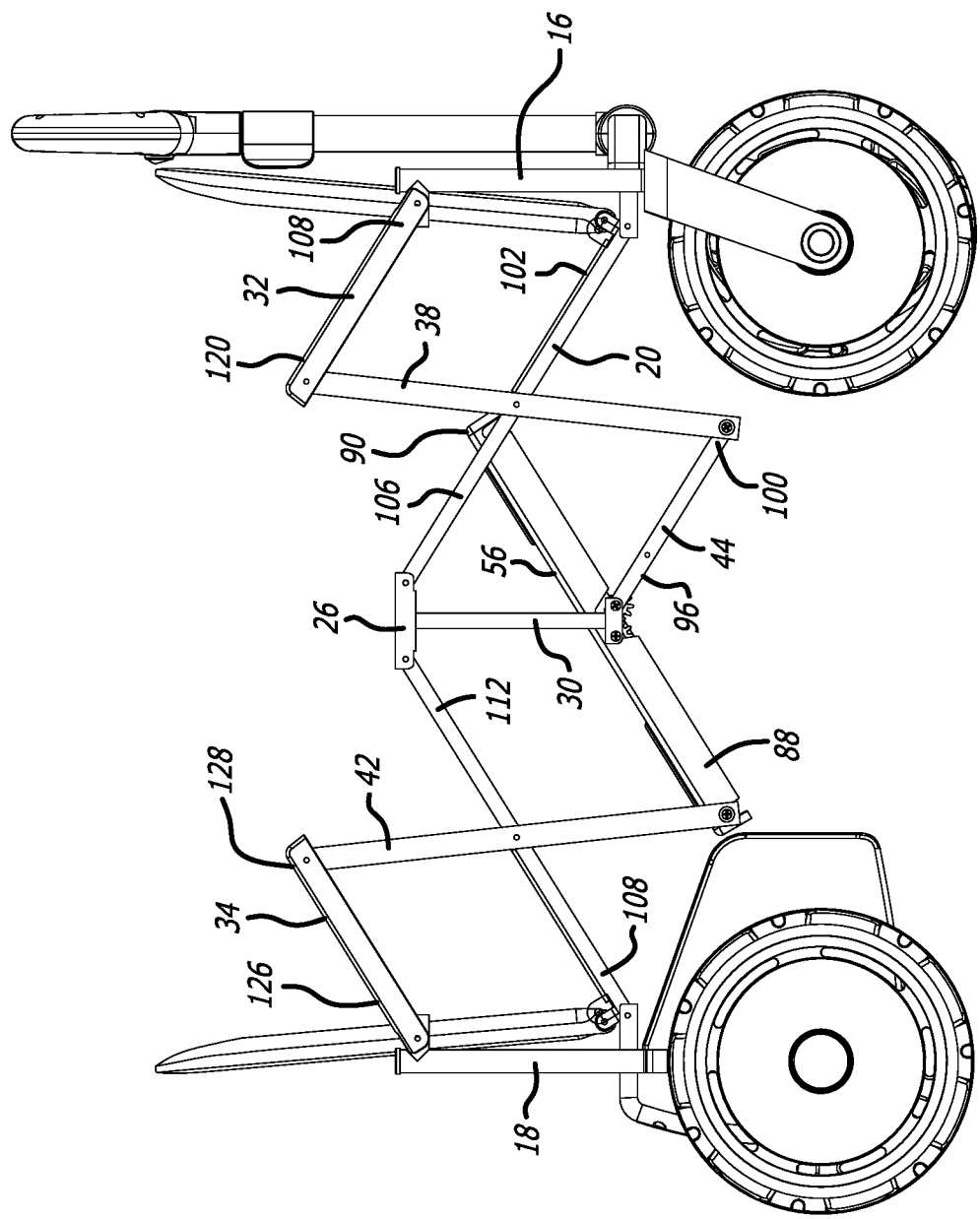
FIG. 8 is a side view of the foldable wagon of FIG. 7 in the partially folded configuration.

In one embodiment, the rear foot well support 46 has a first end 92 and a second end 94. And, in one embodiment, the front foot well support 44 has a first end 100 and a second end 96. Referring, for example, to FIG. 9, in one embodiment, the footrest 56 is connected to the rear foot well support 46. Specifically, in one embodiment the first end 88 of the footrest 56 is connected to the first end 92 of the rear foot well support 46. Additionally, the footrest 56 is connected to the second end 94 of the rear foot well support 46. The footrest 56, however, is not directly connected to the front foot well support 44, and instead rests on the front foot well support 44 in the lower position as shown in FIGS. 2-4.

Figure 13:
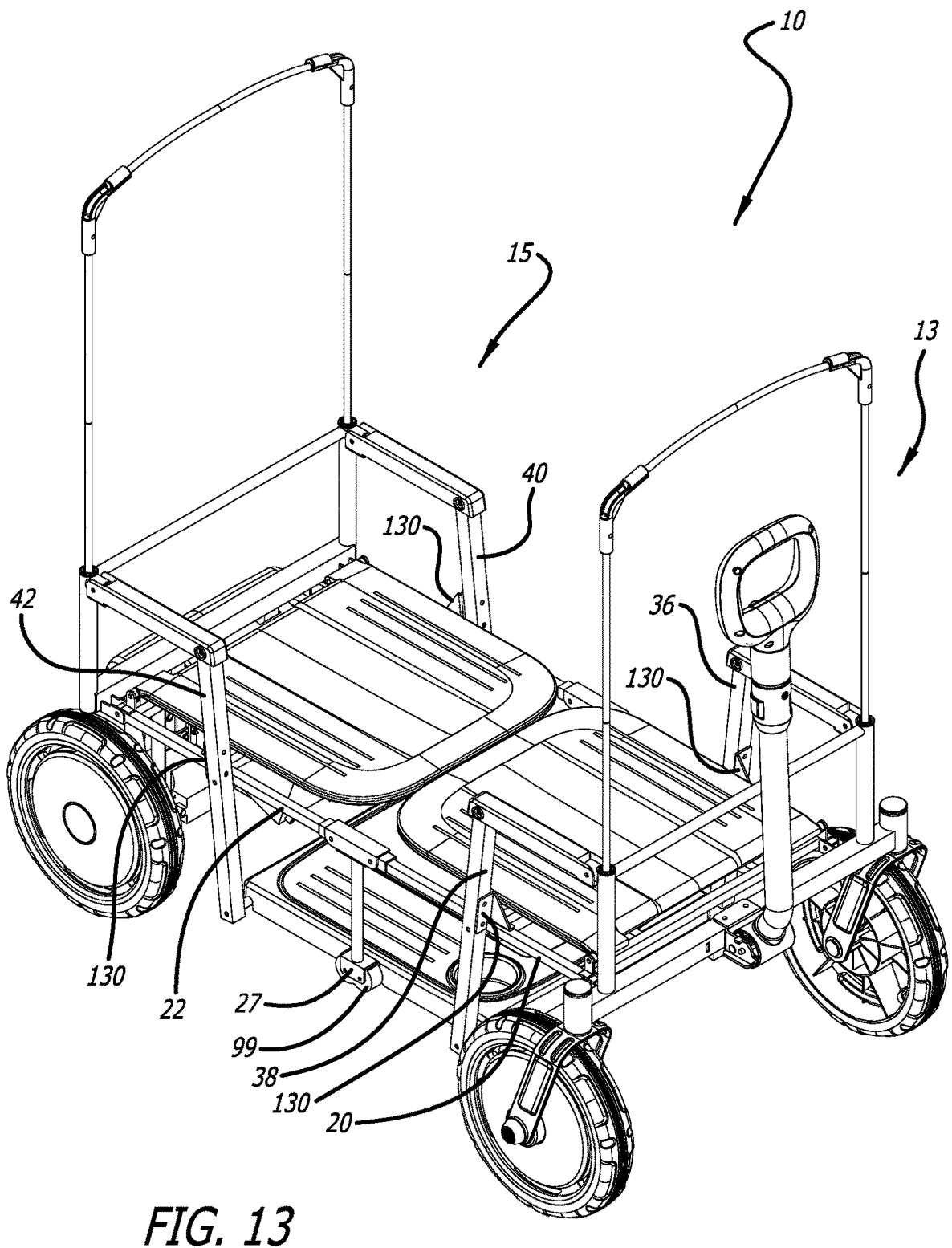
FIG. 13 is a top perspective front view of another embodiment of a foldable wagon with the seat backs in the down orientation and a canopy frame connected to the wagon.
Figure 14:
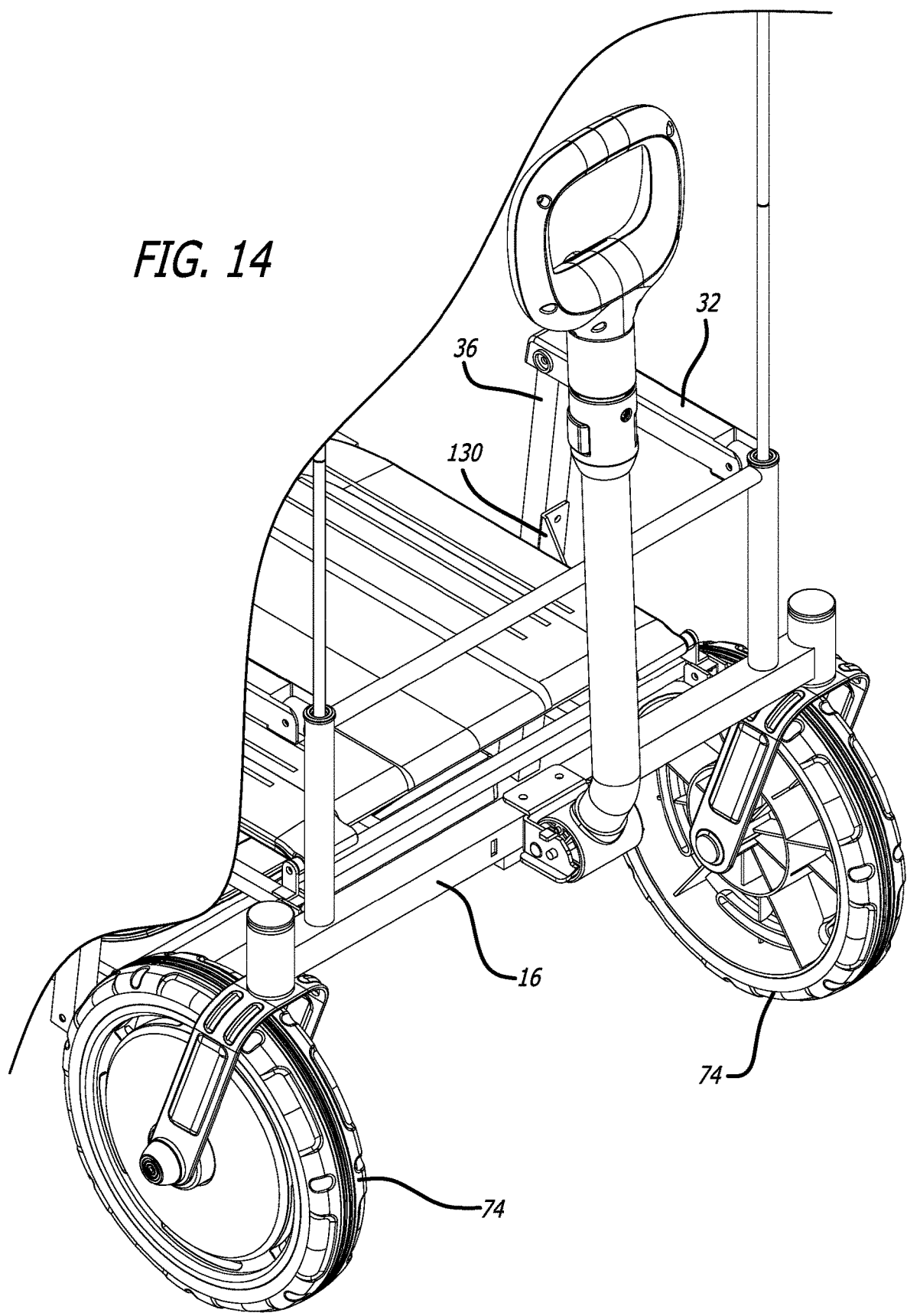
FIG. 14 is a partial perspective view of the front frame structure of the foldable wagon of FIG. 13.

In an alternate embodiment, as best shown in FIGS. 13 and 14, support brackets 130 are provided to provide support and additional rigidity to the wagon frame in the open or use position. For example, one support bracket 130 is connected to each seat linkage 20, 22. Each support bracket 130 has an angled surface to engage the respective vertical linkage 36, 38, 40, 42 when the wagon 10 is in the use position (see FIG. 13). The angled surface of the support bracket 130 operates as a stop for the vertical linkages 36, 38, 40, 42.

Figure 12:
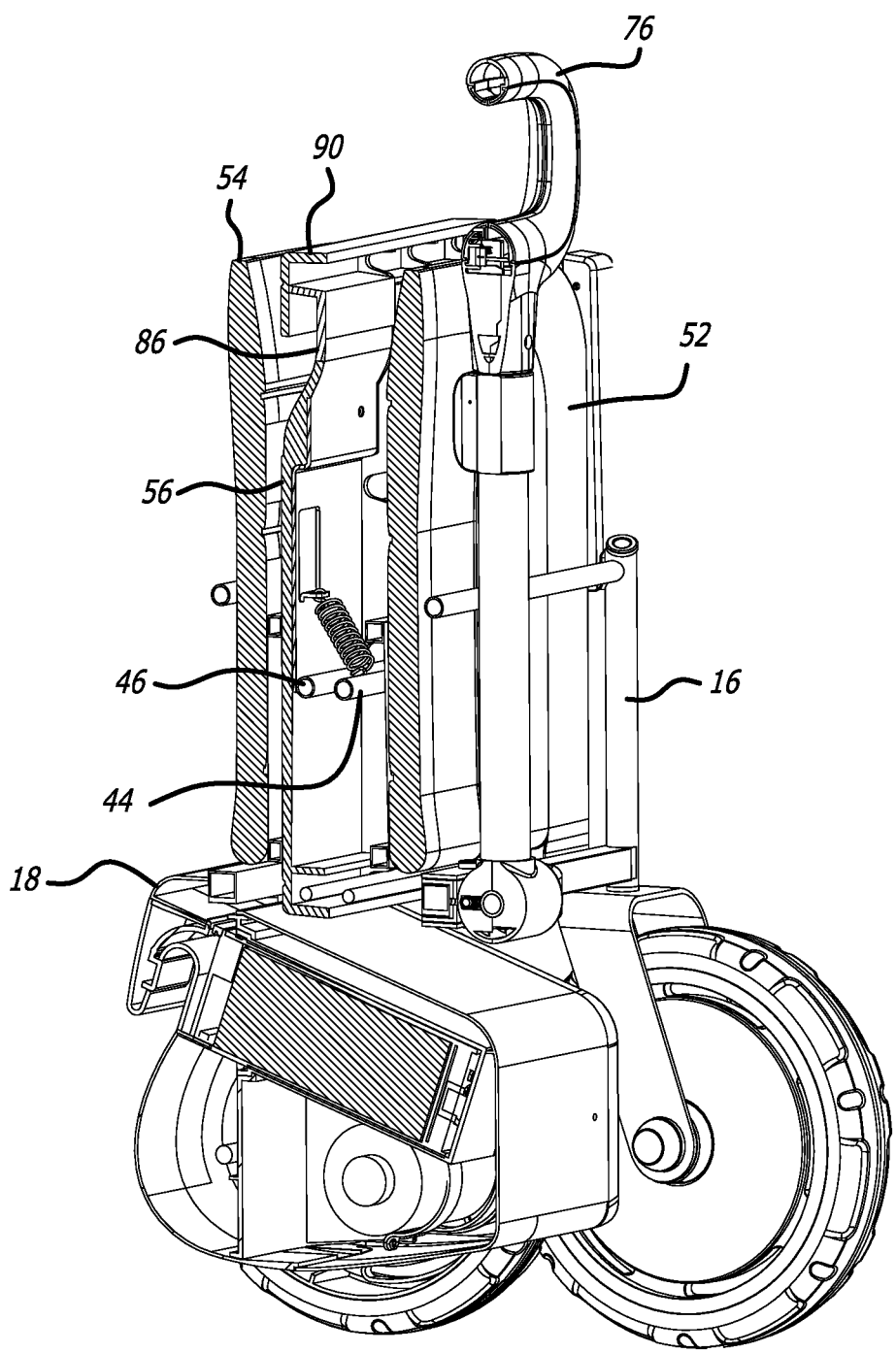
FIG. 12 is a cross-sectional perspective view about line 12-12 of FIG. 10.

To fold the foldable wagon 10, the user first grasps the handle 86 in the footrest 56. As best shown in FIGS. 9 and 12, the handle 86 is built into the body of the footrest 56. In a preferred embodiment, the footrest 56 is pivotally connected to the frame assembly 12 at a first end 88 between the first rear vertical linkage 40 and the second rear vertical linkage 42, and the second end 90 of the footrest 56 merely rests on the front foot well support 44, but is not connected to the front foot well support 44. Accordingly, in one embodiment the footrest 56 is free at the second end 90 of the footrest 56.

When the footrest 56 is raised by the handle 86 the folding action of the foldable frame assembly 12 is set into action. As best shown in FIGS. 3, 4 and 7-9, by lifting the second end 90 of the footrest 56, the footrest 56 is pivoted upwardly about a pivot connection between the rear foot well support 46 and the rear vertical linkages 40, 42. Accordingly, as the second end 90 of the footrest 56 is lifted, the first end 88 of the footrest 56 and the first end support 92 of the rear foot well support 46 are pivoted with respect to the lower ends of the first and second rear vertical linkages 40, 42. Similarly, when the second end 90 of the footrest 56 is lifted, the second end support 94 of the rear foot well support 46 is simultaneously pivoted upwardly.

Figure 15:
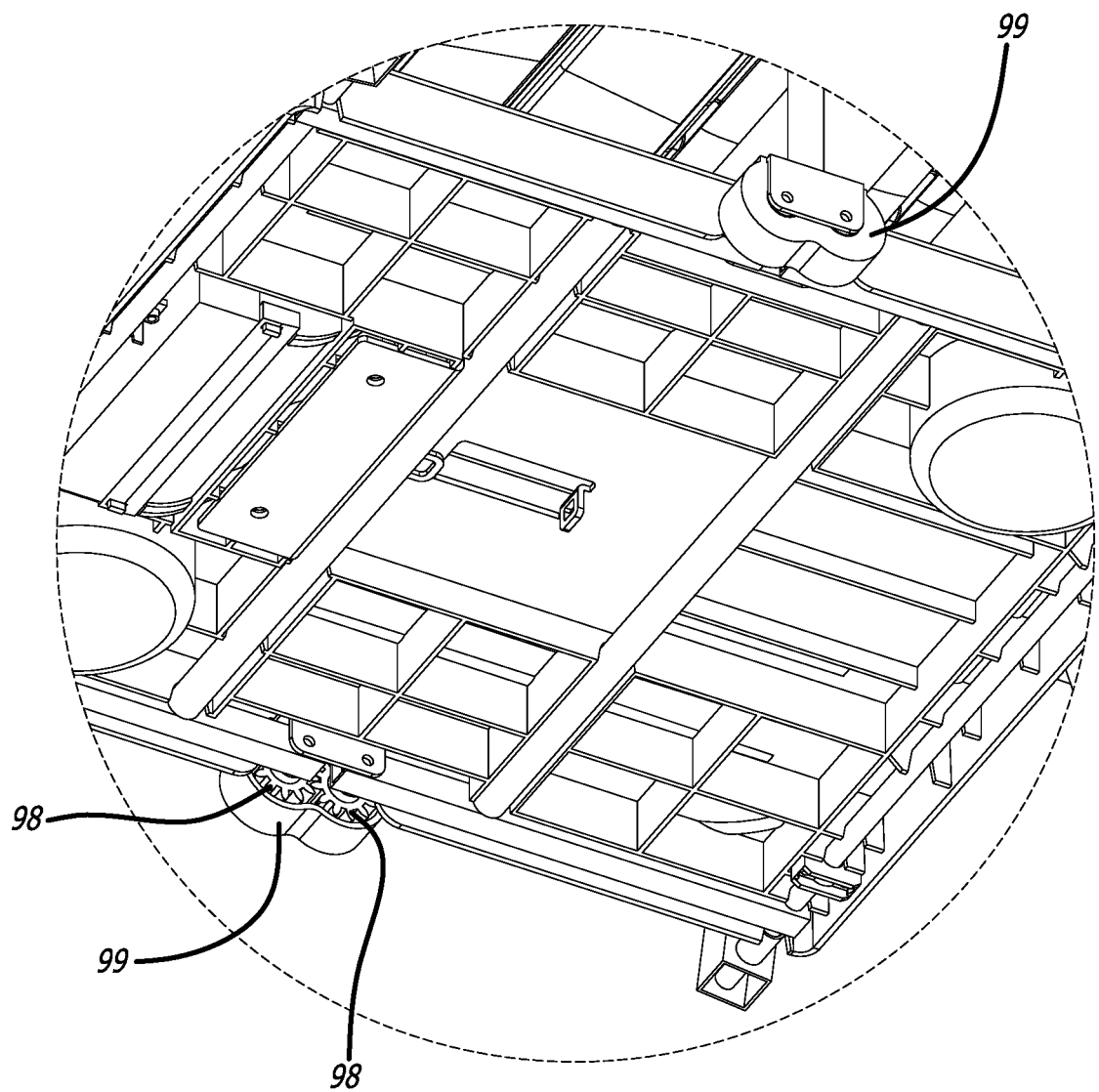
FIG. 15 is a partial perspective view of a folding mechanism for the foldable wagon of FIG. 13.
Figure 16:
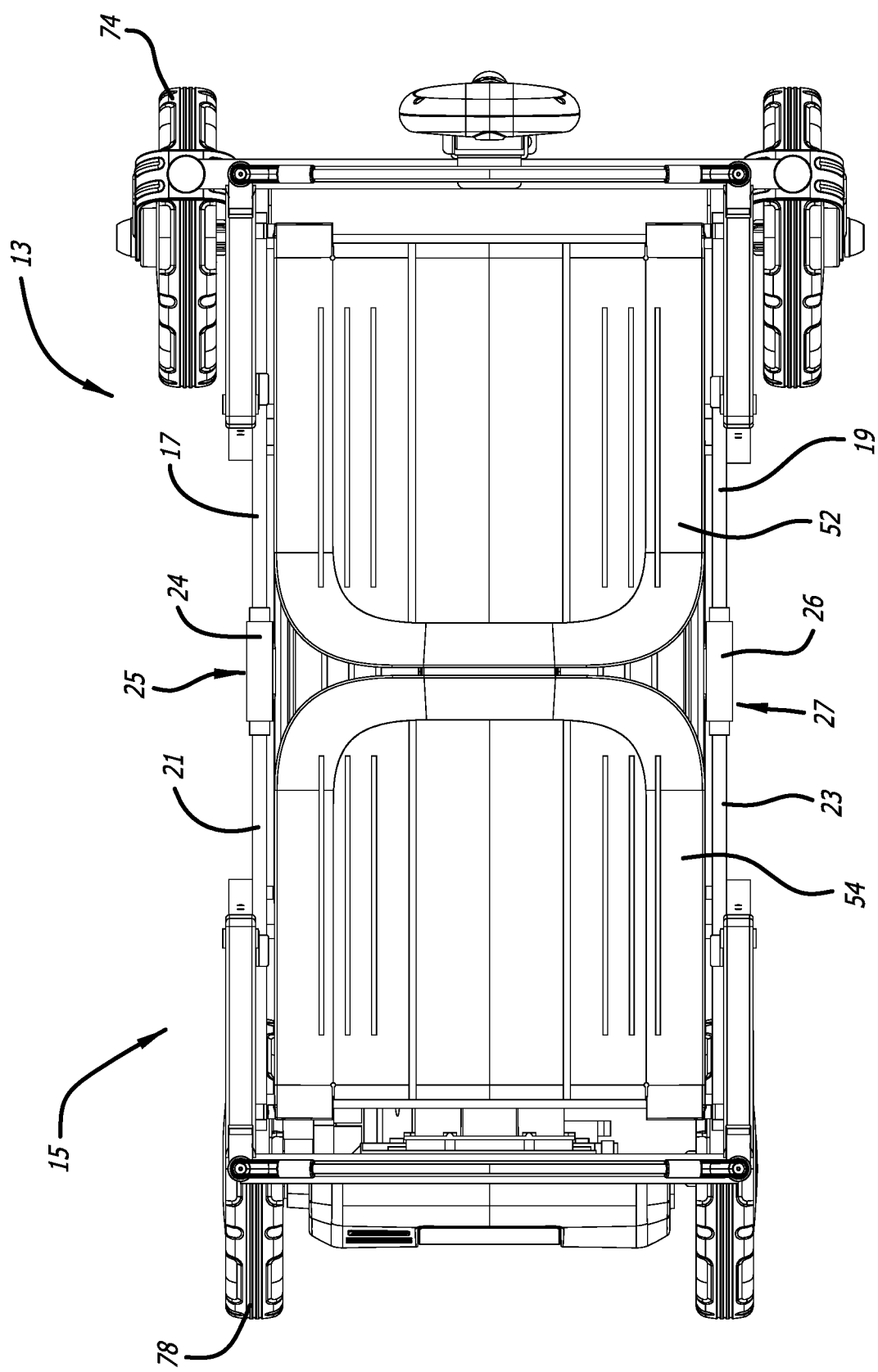
FIG. 16 is a top view of the foldable wagon of FIG. 13.

In one embodiment, a timing member 98, also referred to as a synching member 98, connects the front frame assembly 13 to the rear frame assembly 15. Accordingly, in one embodiment, the rear foot well support 46 is pivotally connected to the front foot well support 44 by the timing or synching members 98. The timing members 98 ensure that the rear foot well support 46 and the front foot well support 44 pivot, in opposite directions, simultaneously. In one embodiment the timing members 98 are a series of gears 98, such as a first gear 98 connected to the front frame assembly and a mating second gear 98 connected to the rear frame assembly. Further, in an alternate embodiment, as shown in FIGS. 13 and 15, a cover 99 may be provided over the timing members 98 for safety purposes.

Accordingly, when the footrest 56 is pivoted upwardly, the second end support 94 of rear foot well support 46 and the second end support 96 of the front foot well support 44 are also both pivoted upwardly together (about opposite pivot points, those being the connection of the rear footwell support 46 with the rear vertical linkages 40, 42 and the connection of the front footwell support 44 with the front vertical linkages 36, 38) at the bottom of the first and second center linkages 28, 30. Similar to how the rear foot well support 46 is pivotally connected to the lower ends of the first and second rear vertical linkages 40, 42, the front foot well support 44 is pivotally connected to the lower ends of the first and second front vertical linkages 36, 38.

In one embodiment, four separate four-bar linkages are created by different pivoting connections at each side of the frame assembly 12, for a total of eight four-bar linkages. A first four bar linkage is created by the pivotal connection of the first front armrest 32, the first front vertical linkage 36, the first front seat linkage 20 and the front frame 16. The second four bar linkage is created by the pivotal connection of the second front armrest 32, the second front vertical linkage 38, the second front seat linkage 20 and the front frame 16. The third four bar linkage is created by the pivotal connection of the first front seat linkage 20, the first center linkage 28, the front foot well support 44 and the first front vertical linkage 36. The fourth four bar linkage is created by the pivotal connection of the second front seat linkage 20, the second center linkage 30, the front foot well support 44 and the second front vertical linkage 38. The fifth four bar linkage is created by the pivotal connection of the first rear armrest 34, the first rear vertical linkage 40, the first rear seat linkage 22 and the rear frame 18. The sixth four bar linkage is created by the pivotal connection of the second rear armrest 34, the second rear vertical linkage 42, the second rear seat linkage 22 and the rear frame 18. The seventh four bar linkage is created by the pivotal connection of the first rear seat linkage 22, the first center linkage 28, the rear foot well support 46 and the first rear vertical linkage 40. The eighth four bar linkage is created by the pivotal connection of the second rear seat linkage 22, the second center linkage 30, the rear foot well support 46 and the second rear vertical linkage 42.

Accordingly, as explained above, when the footrest 56 is raised by the handle 86 the folding action of the foldable frame assembly 12 is set into action. Referring to FIGS. 7-12, the eight four-bar linkages described above fold to collapse the collapsible frame assembly 12 so that the front section of the frame assembly (i.e., from the first and second pivot brackets 24, 26 to the front frame 16) moves toward the center linkages 28, 30, and the rear section of the frame assembly (i.e., from the first and second pivot brackets 24, 26 to the rear frame 18) moves toward the center linkages 28, 30. The final folded frame assembly 12 is shown in FIGS. 10-12.

To unfold the foldable frame assembly 12 into the unfolded configuration the reverse operation is conducted. Accordingly, the front section of the frame assembly moves distal the center linkages and the rear section of the frame assembly moves distal the center linkages in the opposite direction.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A foldable wagon configurable in a use configuration and folded configuration, the foldable wagon comprising:
   a front frame assembly;
   a rear frame assembly;
   a first upper pivot bracket connecting an upper portion of the front frame assembly to an upper portion of the rear frame assembly;
   a first lower pivot bracket connecting a lower portion of the front frame assembly to a lower portion of the rear frame assembly;
   a timing member further connecting the front frame assembly to the rear frame assembly; and,
   a footrest covering a portion of the front frame assembly and a portion of the rear frame assembly, the footrest having a first end connected to the rear frame assembly and a second end free from connection to the front frame assembly, wherein when the second end of the footrest is raised the rear frame assembly and the front frame assembly begin to pivot the foldable wagon from the use configuration to the folded configuration.

2. The foldable wagon of claim 1, further comprising a front foldable seat backrest pivotally connected to the front frame assembly, and a rear foldable seat backrest pivotally connected to the rear frame assembly.

3. The foldable wagon of claim 2, wherein the front foldable seat backrest pivots between a raised position and a folded position.

4. The foldable wagon of claim 1, wherein the timing member comprises a first gear connected to the front frame assembly and a second gear connected to the rear frame assembly, the first gear mating with the second gear.

5. The foldable wagon of claim 1, further comprising a front fixed seat connected to the front frame assembly, and a rear fixed seat connected to the rear frame assembly.

6. The foldable wagon of claim 1, wherein the front frame assembly comprises a first front side assembly spaced from a second front side assembly with a front frame and a front foot well support, and wherein the rear frame assembly comprises a first rear side assembly spaced from a second rear side assembly with a rear frame and a rear foot well support.

7. The foldable wagon of claim 6, wherein the first upper pivot bracket pivotally connects the first front side assembly to the first rear side assembly, and further comprising a second upper pivot bracket pivotally connecting the second front side assembly to the second rear side assembly.

8. The foldable wagon of claim 7, wherein the first lower pivot bracket pivotally connects the first front side assembly to the first rear side assembly, and further comprising a second lower pivot bracket pivotally connecting the second front side assembly to the second rear side assembly.

9. The foldable wagon of claim 8, further comprising a first center linkage connecting the first upper pivot bracket to the first lower pivot bracket, and a second center linkage connecting the second upper pivot bracket to the second lower pivot bracket.

10. The foldable wagon of claim 6, further comprising a front armrest pivotally connected to the front frame, a front vertical linkage having a first end and a second end, the first end of the front vertical linkage pivotally connected to the front armrest and the second end of the front vertical linkage pivotally connected to the front foot well support, a rear armrest pivotally connected to the rear frame, a rear vertical linkage having a first end and a second end, the first end of the rear vertical linkage pivotally connected to the rear armrest and the second end of the rear vertical linkage pivotally connected to the rear foot well support.

11. The foldable wagon of claim 10, further comprising a front seat linkage having a first end and a second end, the first end of the front seat linkage pivotally connected to the front frame, the second end of the front seat linkage pivotally connected to the first upper pivot bracket, and the front vertical linkage pivotally connected to the front seat linkage between the first end and the second end of the front seat linkage, a rear seat linkage having a first end and a second end, the first end of the rear seat linkage pivotally connected to the rear frame, the second end of the rear seat linkage pivotally connected to the first upper pivot bracket, and the rear vertical linkage pivotally connected to the rear seat linkage between the first end and the second end of the rear seat linkage.

12. The foldable wagon of claim 1, further comprising a pair of rotatable front wheels pivotally connected to the front frame assembly, and a pair of rotatable rear wheels connected to the rear frame assembly.

13. The foldable wagon of claim 12, wherein the pair of front wheels are connected to the front frame assembly exterior to a side of the front frame assembly, and wherein the pair of rear wheels are connected to the rear frame assembly interior to a side of the rear frame assembly.

14. The foldable wagon of claim 1, wherein the footrest has a handle adjacent the second end of the footrest.

15. A foldable wagon configurable in a use configuration and folded configuration, the foldable wagon comprising:
   a front frame assembly comprising a first front side assembly, a second front side assembly spaced apart from the first front side assembly, a front frame joining the first front side assembly and the second front side assembly, a front foot well support between the first front side assembly and the second front side assembly, and a front seat between the first front side assembly and the second front side assembly;
   a rear frame assembly comprising a first rear side assembly, a second rear side assembly spaced apart from the first rear side assembly, a rear frame joining the first rear side assembly and the second rear side assembly, a rear foot well support between the first rear side assembly and the second rear side assembly, and a rear seat between the first rear side assembly and the second rear side assembly;
   the first front side assembly having a first front seat linkage having a first end and a second end, the first end of the first front seat linkage pivotally connected to the front frame and the second end of the first front seat linkage pivotally connected to a first upper pivot bracket;
   the second front side assembly having a second front seat linkage having a first end and a second end, the first end of the second front seat linkage pivotally connected to the front frame and the second end of the second front seat linkage pivotally connected to a second upper pivot bracket;
   the first rear side assembly having a first rear seat linkage having a first end and a second end, the first end of the first rear seat linkage pivotally connected to the rear frame and the second end of the first rear seat linkage pivotally connected to the first upper pivot bracket;
   the second rear side assembly having a second rear seat linkage having a first end and a second end, the first end of the second rear seat linkage pivotally connected to the rear frame and the second end of the second rear seat linkage pivotally connected to the second upper pivot bracket;

a first front armrest pivotally connected to the front frame, and a first front vertical linkage having a first end and a second end, the first end of the first front vertical linkage pivotally connected to the first front armrest and the second end of the first front vertical linkage pivotally connected to the front foot well support;

a second front armrest pivotally connected to the front frame, and a second front vertical linkage having a first end and a second end, the first end of the second front vertical linkage pivotally connected to the second front armrest and the second end of the second front vertical linkage pivotally connected to the front foot well support;

a first rear armrest pivotally connected to the rear frame, and a first rear vertical linkage having a first end and a second end, the first end of the first rear vertical linkage pivotally connected to the first rear armrest and the second end of the first rear vertical linkage pivotally connected to the rear foot well support;

a second rear armrest pivotally connected to the rear frame, and a second rear vertical linkage having a first end and a second end, the first end of the second rear vertical linkage pivotally connected to the second rear armrest and the second end of the second rear vertical linkage pivotally connected to the rear foot well support;

a first lower pivot bracket and a second lower pivot bracket, the first lower pivot bracket pivotally connected to a first side of the front foot well assembly and pivotally connected to a first side of the rear foot well assembly, and the second lower pivot bracket pivotally connected to a second side of the front foot well assembly and pivotally connected to a second side of the rear foot well assembly;

a first center linkage connected to the first upper pivot bracket and the first lower pivot bracket; and, a second center linkage connected to the second upper pivot bracket and the second lower pivot bracket.

16. The foldable wagon of claim 15, wherein the first front vertical linkage is pivotally connected to the first front seat linkage, wherein the second front vertical linkage is pivotally connected to the second front seat linkage, wherein the first rear vertical linkage is pivotally connected to the first rear seat linkage, and wherein the second rear vertical linkage is pivotally connected to the second rear seat linkage.

17. The foldable wagon of claim 15, further comprising a first timing member connecting the first side of the front foot well assembly to the first side of the rear foot well assembly, and a second timing member connecting the second side of the front foot well assembly to the second side of the rear foot well assembly.

18. The foldable wagon of claim 15, further comprising a footrest having a first end and a second end, the first end of the footrest being connected to the rear foot well assembly between the first rear vertical linkage and the second rear vertical linkage, the second end of the footrest being positioned between the first front vertical linkage and the second front vertical linkage, the second end of the footrest being free from connection to the front foot well assembly, wherein when the second end of the footrest is raised the rear frame assembly and the front frame assembly begin to pivot the foldable wagon from the use configuration to the folded configuration.

19. The foldable wagon of claim 15, further comprising a front foldable seat backrest pivotally connected to the front frame assembly, and a rear foldable seat backrest pivotally connected to the rear frame assembly.

20. The foldable wagon of claim 17, wherein the first timing member comprises a first gear connected to the first side of the front frame assembly and a second gear connected to the first side of the rear frame assembly, the first gear mating with the second gear, and wherein the second timing member comprises a first gear connected to the second side of the front frame assembly and a second gear connected to the second side of the rear frame assembly, the first gear mating with the second gear.

21. A foldable wagon configurable in a use configuration and folded configuration, the foldable wagon comprising:
a front frame assembly;
a rear frame assembly;
an upper pivot bracket pivotally connecting an upper portion of the front frame assembly to an upper portion of the rear frame assembly;
a lower pivot bracket pivotally connecting a lower portion of the front frame assembly to a lower portion of the rear frame assembly; and,
a timing member further connecting the front frame assembly to the rear frame assembly, the timing member comprising a first gear connected to the front frame assembly and a second gear connected to the rear frame assembly, the first gear mating with the second gear, wherein the timing member assists to maintain the front frame assembly synched with the rear frame assembly during folding and unfolding of the foldable wagon.

22. A foldable wagon configurable in a use configuration and folded configuration, the foldable wagon comprising:
a front frame assembly having a front seat and a front foot well support;
a rear frame assembly having a rear seat and a rear foot well support;
an upper pivot bracket pivotally connecting an upper portion of the front frame assembly to an upper portion of the rear frame assembly;
a lower pivot bracket pivotally connecting a lower portion of the front frame assembly to a lower portion of the rear frame assembly; and,
a footrest covering a portion of the front foot well support and a portion of the rear foot well support, the footrest having a first end connected to the rear foot well support and a second end free from connection to the front foot well support, wherein when the second end of the footrest is raised the rear frame assembly and the front frame assembly begin to pivot the foldable wagon from the use configuration to the folded configuration.

* * * * *